United States Patent
Ozu et al.

[11] Patent Number: 6,089,834
[45] Date of Patent: Jul. 18, 2000

[54] HELICAL COMPRESSOR AND METHOD OF ASSEMBLING THE SAME

[75] Inventors: Masao Ozu, Fuji; Takayoshi Fujiwara, Yokohama; Masatoshi Yoshida, Fuji; Takuya Hirayama, Fujisawa; Tatsuya Itou, Hirakata; Hiroyuki Mizuno, Fuji, all of Japan

[73] Assignee: Kabushiki Kaisha Toshiba, Kawasaki, Japan

[21] Appl. No.: 09/177,682

[22] Filed: Oct. 22, 1998

[30] Foreign Application Priority Data

Oct. 23, 1997 [JP] Japan ................................. 9-291063
Oct. 23, 1997 [JP] Japan ................................. 9-291229

[51] Int. Cl.⁷ ............................. F04C 18/22; F04C 29/00; F04B 35/04
[52] U.S. Cl. ........................ 417/410.1; 417/356; 418/220
[58] Field of Search ................................ 417/356, 410.1, 417/410.3, 410.5, 423.12, 423.13; 418/55.1, 55.2, 220

[56] References Cited

U.S. PATENT DOCUMENTS

| | | | |
|---|---|---|---|
| 4,179,248 | 12/1979 | Shaw ..................................... | 417/410.1 |
| 5,174,737 | 12/1992 | Sakata et al. ........................... | 418/220 |
| 5,252,048 | 10/1993 | Fujiwara et al. ....................... | 418/220 |
| 5,286,174 | 2/1994 | Fujiwara et al. ........................ | 418/220 |
| 5,332,377 | 7/1994 | Hirayama et al. ...................... | 418/220 |
| 5,388,969 | 2/1995 | Fujiwara et al. ........................ | 418/220 |
| 5,476,369 | 12/1995 | Fowlkes et al. ..................... | 417/410.5 |
| 5,558,512 | 9/1996 | Fujiwara et al. ........................ | 418/220 |
| 5,624,243 | 4/1997 | Omodaka et al. ................... | 417/410.5 |

FOREIGN PATENT DOCUMENTS 4-58086  2/1992  Japan .

Primary Examiner—Willis R. Wolfe
Attorney, Agent, or Firm—Limbach & Limbach LLP

[57] ABSTRACT

In a helical compressor, a helical compression unit is accommodated in the case. The compression unit has a cylinder, a roller eccentrically disposed in the cylinder and a helical blade disposed between an inner surface of the cylinder and the roller for separately forming a plurality of compression chambers therebetween along an axial direction of the roller. A motor unit is accommodated in the case and is operatively connected to the helical compression unit through a rotating shaft for eccentrically rotating the roller in the cylinder through the rotating shaft. According to the rotation of the roller, compressive fluid sucked into a lower compression chamber is moved along an axial direction of the rotating shaft while being sequentially compressed. The helical compression unit and the motor unit is arranged so that the helical compression unit and the motor unit are partially overlapped to each other along the axial direction.

30 Claims, 14 Drawing Sheets

6,089,834

HELICAL COMPRESSOR AND METHOD OF ASSEMBLING THE SAME

BACKGROUND OF THE INVENTION

1. Field of the Invention

The present invention relates to a helical compressor for successively compressing compressive fluid, such as refrigerant in a refrigerating cycle and a method of assembling the helical compressor. More particularly, the present invention relates to a helical compressor having an improved structure for assembling the compressor, a structure for supporting a bearing and a structure for supporting a balancer and a method of assembling the helical compressor.

2. Description of Prior Art

A refrigerating cycle in an air conditioner for heating/cooling a room and in a refrigerator are provided with a compressor which compresses a refrigerant. As a type of compressors of compressing the refrigerant, a helical compressor which has a compression unit operated by a motor and using a helical blade provided therefor has been developed.

In a conventional helical compressor having the helical blade, a sealed case accommodates a helical compression unit and a motor unit, in series, connected to the helical compression unit through a rotating shaft so as to operate the helical compression unit therethrough. The helical compression unit is provided with a cylinder secured to the sealed case and a roller serving as a rotating member which is accommodated at an eccentric position in the cylinder.

The helical compressor also has a helical blade which is interposed between the roller and the cylinder and is wound around a helical groove formed in the outer surface of the roller. A plurality of low-pressure compression chambers are formed between the cylinder and the roller by a dint of the helical blade along the axial direction of the cylinder.

The roller is joined to a crank portion of the rotating shaft, while the rotating shaft is rotatably supported by a main bearing and a sub bearing which close both ends of the cylinder, respectively.

When electric power is supplied to the motor unit, the motor unit is turned on so that the rotor is rotated so that the rotating shaft is rotated. The rotational force of the rotating shaft is transmitted to the crank portion thereof so that the roller is eccentrically rotated. Since the roller is eccentrically rotated, the refrigerant sucked into a low-pressure compression chamber of the cylinder is gradually compressed while helically being moved along the axial direction of the roller. The compressed and helically moving refrigerant is guided from the high pressure compression chamber into the sealed case and passes through a gap formed between the sealed case and the motor unit and so forth, so that the refrigerant is discharged to the outside of the sealed case through a discharge pipe.

In the above conventional helical compressor, the both ends of the cylinder are closed by the main bearing and the sub bearing. The main bearing and the sub bearing rotatably and stably support the rotating shaft which is the output shaft of the motor unit.

However, in the above conventional helical compressor, the motor unit and the helical compression unit, which are accommodated in the sealed case, are disposed while they are separated individually along the axial direction of the rotating shaft. Therefore, since the longitudinal length of the sealed case cannot be shortened, it is difficult to make the helical compressor compact and small.

That is, a vertical type compressor, which is arranged in that the axial direction of the rotating shaft, such as the longitudinal direction, is orthogonal to a horizontal plane, has an excessively large height, and a horizontal type compressor, which is arranged in that the axial direction of the rotating shaft is in parallel with the horizontal plane, requires an excessively large space for installing the horizontal type compressor in the apparatus having the refrigerant cycle, such as air conditioners, refrigerators or other similar apparatus.

As a result of that, in the conventional vertical type and horizontal type compressors, piping elements which must be connected to the conventional compressors cannot easily be assembled, thereby making the apparatuses, each of which has one of the conventional compressors, large.

In the conventional helical compressor, weight unbalance caused from the rotation of the rotating shaft is corrected by a plurality of balancers, for example, not less than 3, attached to portions of the helical compressor, which are positioned exteriorly to a space formed between the main bearing and sub bearing. For example, one of the balancers is attached to the rotor and another of the balancers is attached to the end portion of the rotating shaft, which projects from the sub bearing toward one side opposite to the rotor side.

Since the plurality of individual balancers are attached to the portions positioned exteriorly to the space formed between the main bearing and sub bearing, respectively, the number of the elements constituting the helical compressor cannot be reduced and spaces in the sealed case of the helical compressor are small.

In addition, because the motor unit and the helical compression unit are disposed in the sealed case while they are separated individually along the axial direction of the rotating shaft, the overall length of the rotating shaft is long.

Therefore, the number of the balancers, which are attached to the portions positioned exteriorly to the space formed between the main bearing and sub bearing, are large, so that the process for attaching each of the large number of the balancers takes a long time and is complicated.

On the other hand, it is true that the rotating shaft is stably supported by the main bearing and the sub bearing.

However, because the motor unit and the helical compression unit are disposed in the sealed case while they are separated individually along the axial direction of the rotating shaft, it is difficult to align a center axial direction of the rotating shaft with center axial directions of the main and sub bearings.

More particularly, due to using the two bearings (main bearing and sub bearing), it needs to align the center axial directions of the two main and sub bearings each other. Thus, an additional process for aligning the center axial directions of the main and sub bearing must be performed when the helical compressor is assembled, whereby it takes a long time for assembling the helical compressor.

SUMMARY OF THE INVENTION

In view of the foregoing problems, an object of the present invention is to provide a helical compressor having a simple structure, permitting an assembling process to be performed easily and having a small and compact size, and a method of assembling the helical compressor.

Another object of the present invention is to provide a helical compressor which does not require an aligning process, with which the number of required elements constituting the helical compressor can be reduced and which enables the assembling process to be simplified and facilitated, and a method of assembling the helical compressor.

Another object of the present invention is to provide a helical compressor adapted to prevent vibrations of the compression unit thereby improving reliability of the helical compressor, and a method of assembling the helical compressor.

Further object of the present invention is to provide a helical compressor adapted to reduce the number and volume of balancers which are disposed at the portions positioned exteriorly to the space formed between the main bearing and sub bearing, thereby saving a space in the sealed case and simplifying the attachment process of the balancers.

In order to achieve such objects, according to one aspect of the present invention, there is provided with a helical compressor comprising a case; a helical compression unit accommodated in the case and having a cylinder, a rotating member eccentrically disposed in the cylinder and a helical blade disposed between an inner surface of the cylinder and the rotating member for forming a plurality of compression chambers therebetween; and a motor unit accommodated in the case and operatively connected to the helical compression unit through a rotating shaft for eccentrically rotating the rotating member in the cylinder through the rotating shaft so that compressive fluid sucked into one of the compression chambers is moved along an axial direction of the rotating shaft while being sequentially compressed, wherein the helical compression unit and said motor unit is arranged so that the helical compression unit and the motor unit are partially overlapped to each other along the axial direction.

In preferred embodiment of this aspect, wherein the motor unit has a rotor joined to the rotating shaft and a stator disposed apart from an outer peripheral surface of the rotor for a predetermined gap and fitted in an inner surface of the case, and wherein the helical compression unit has one end portion facing to the rotor of the motor unit, said one end portion of the helical compression unit being inserted in an inner surface portion of the stator and so fitted to the inner surface portion of the stator as to be supported thereby.

This aspect of the present invention has an arrangement that the helical compression unit is provided with a main bearing having an outer diameter for rotatably supporting the rotating shaft, said outer diameter being the same as an inner diameter of the cylinder, the main bearing is disposed inside one end portion of the cylinder, and that the end portion of the cylinder facing to the rotor is inserted in the inner surface portion of the stator and so fitted to the inner surface portion of the stator as to be supported thereby.

In preferred embodiment of this aspect, wherein the helical compression unit is provided with a sub bearing having an outer diameter for rotatably supporting the rotating shaft, said outer diameter being the same as the inner diameter of the cylinder, and wherein the sub bearing is disposed inside another end portion of the cylinder.

For achieving such objects, according to another aspect of the present invention, there is provided with a helical compressor comprising a case; a helical compression unit accommodated in the case and having a cylinder, a rotating member eccentrically disposed in the cylinder and a helical blade disposed between an inner surface of the cylinder and the rotating member for forming a plurality of compression chambers therebetween; a motor unit accommodated in the case and operatively connected to the helical compression unit through a rotating shaft for eccentrically rotating the rotating member in the cylinder through the rotating shaft so that compressive fluid sucked into one of the compression chambers is moved along an axial direction of the rotating shaft while being sequentially compressed; and single bearing attached to one end portion of the compression unit for rotatably supporting the rotating shaft, said single bearing being adapted to close the one end portion thereof.

In order to achieve such objects, according to further aspect of the present invention, there is provided with a method of assembling a helical compressor comprising the steps of preparing a rotating shaft and a rotor; inserting one end portion of the rotating shaft into the rotor thereby integrating the rotating shaft and rotor; preparing a stator; inserting the rotor having the rotating shaft through one end portion of an inner surface portion of the stator into the inner surface portion thereof; preparing a compression unit having a cylinder, a rotating member eccentrically disposed in the cylinder and a helical blade disposed between an inner surface of the cylinder, the rotating member for forming a plurality of compression chambers therebetween and at least one bearing attached to one end portion of the compression unit for rotatably supporting the rotating shaft, said at least one bearing being adapted to close the one end portion thereof; inserting the compression unit through at least one bearing and the rotating member into the one end portion of the inner surface portion of the stator so that the compression unit and the stator are partially overlapped to each other along an axial direction of the rotating shaft; preparing a case; and attaching the stator having the rotor and the compression unit to an inner surface of the case.

As described above, according to the present invention, the motor unit and the compression unit are partially overlapped to each other so that the overall length of the helical compressor along the axial direction is shortened. Thus, the size reduction of the helical compressor is permitted, the aligning operation can be simplified, and the assembling process can easily be performed. As a result of that, effects can be obtained in that the reliably and the productivity of the helical compressor can be improved.

In addition, since the present invention has the structure that the rotating shaft, which is the output shaft connected to the motor unit, can be supported by the single bearing. Thus, no sub bearing is required. Therefore, the number of elements can be reduced, the structure can be simplified, no operation for aligning the bearings is required and thus the assembling process can easily be performed.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

First embodiment of the present invention will now be described with reference to FIG. 1.

Figure 1:
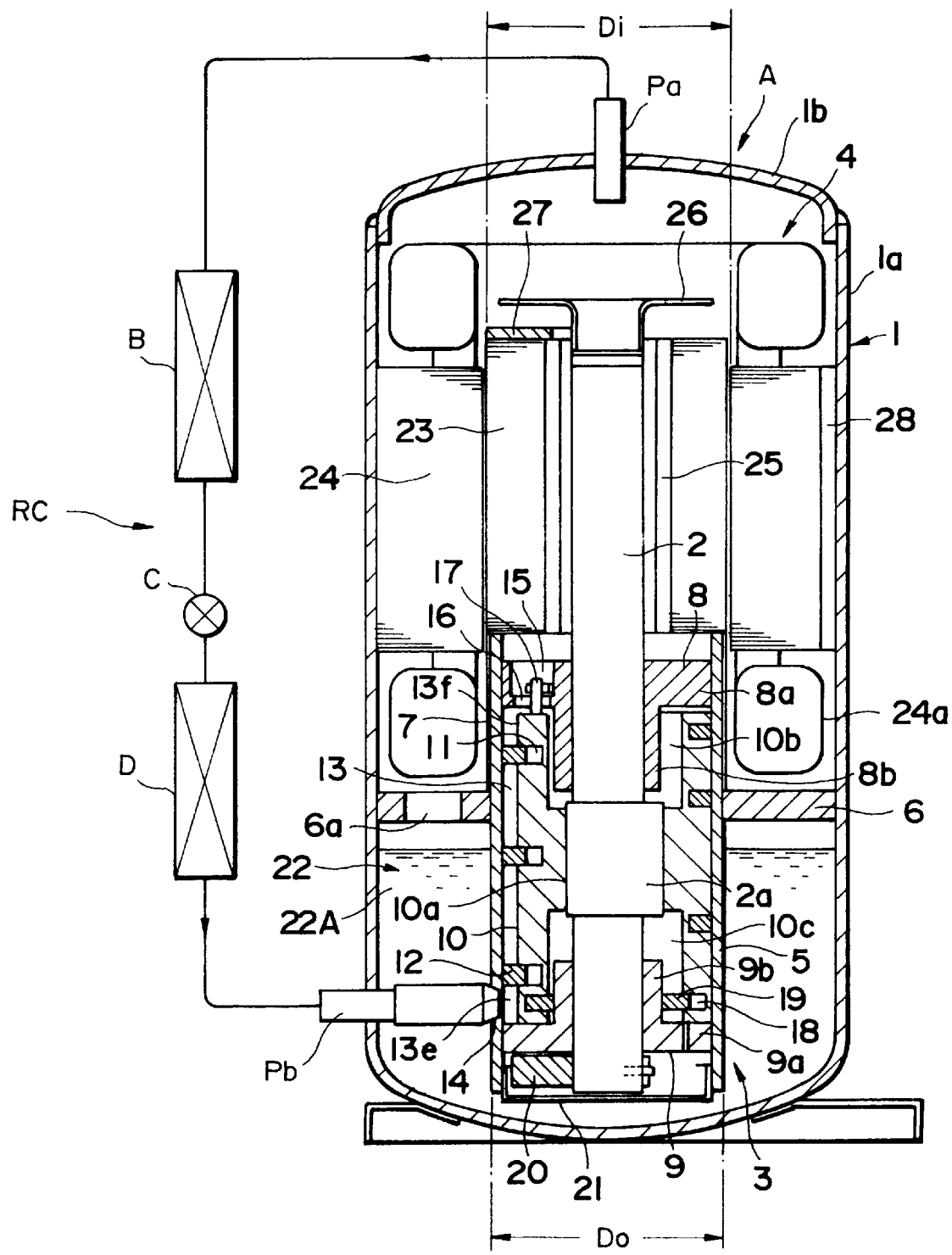
FIG. 1 is a vertical cross sectional view showing a first embodiment of a helical compressor according to the present invention.

As shown in FIG. 1, a helical compressor A constitutes a refrigerating cycle RC of an air conditioner, a refrigeration, a refrigerating showcase or other similar apparatus. The helical compressor A has a discharge-side refrigerant pipe Pa connected to, for example, an upper surface of an upper portion thereof according to this embodiment and has a suction-side refrigerant pipe Pb connected to, for example, a side surface of a lower portion thereof. From the discharge-side refrigerant pipe Pa to the suction-side refrigerant pipe Pb, a condenser B, an expansion valve C serving as a pressure reducing mechanism and an evaporator D are sequentially connected and communicated, whereby the refrigerating cycle RC is constituted.

The foregoing helical compressor A is arranged in that a longitudinal direction thereof, such as a center axial direction thereof is orthogonal to a horizontal plane, which is so called vertical type compressor.

In addition, the vertical type helical compressor has a structure so-called a helical blade compressor. The helical compressor A has a sealed case 1 which accommodates a helical blade compression unit 3 and a motor unit 4 which are connected to each other through a rotating shaft 2.

The sealed case 1 comprises a case body 1a having one opening end portion and a substantially U-shape in its longitudinal cross section, and a cap member 1b hermetically attached to the case body 1a so as to cover the opening end portion of the case body 1a. The compression unit 3 is provided with a cylinder 5 having vertically both opening end portions (upper end portion and lower end portion) opposite to each other and formed into a hollow cylindrical shape having a thin wall. A flange portion 6 is wound around the cylinder 5. The flange portion 6 is secured to the inner surface of the sealed case 1. Therefore, the cylinder 5 is supported by the sealed case 1 through the flange portion 6.

In actual, the outer diameter of the flange portion 6 and the inner diameter of the sealed case 1 are slightly different from each other. In a state in which the flange portion 6 is temporarily held by a jig (not shown), the flange portion 6 is secured by a laser welding beam applied from a laser welding means disposed on the outside of the sealed case 1.

A lubricating-oil return opening 6a to be described later is formed in a predetermined portion of the flange portion 6. An insulating film 7 serving as an insulating member is bonded to an outer surface of an upper portion of the cylinder 5, which projects over the flange portion 6. Thus, the upper portion of the outer surface of the cylinder 5 is completely covered with the insulating film 7.

Inside the upper portion of the cylinder 5, a main bearing 8 is inserted and disposed. The main bearing 8 has a flange portion 8a attached to an inner surface of the upper end portion of the cylinder 5 and a bearing portion 8b having an outer diameter which is smaller than that of the flange portion 8a. The bearing portion 8b is arranged so that the bearing portion 8b extends downwards from the flange portion 8a along the axial direction of the rotating shaft 2. The rotating shaft 2 is so arranged as to be inserted into the flange portion 8a and the bearing portion 8b of the main bearing 8, whereby the rotating shaft 2 is rotatably supported.

Inside a lower portion of the cylinder 5, a sub bearing 9 is inserted and disposed. The sub bearing 9 has a flange portion 9a attached to an inner surface of the lower end portion of the cylinder 5 and a bearing portion 9b having an outer diameter which is smaller than that of the flange portion 9a. The bearing portion 9b is arranged so that the bearing portion 9b extends upwards from the flange portion 9a along the axial direction of the rotating shaft 2. A lower end portion of the rotating shaft 2 is so arranged as to be inserted into the flange portion 9a and the bearing portion 9b of the sub bearing 9, whereby the lower end portion of the rotating shaft 2 is rotatably supported.

In the cylinder 5, a roller 10, which is a rotating member, is eccentrically interposed between the main bearing 8 and the sub bearing 9 and is disposed around the rotating shaft 2. The roller 10 is so arranged that a lower end surface thereof is in contact with an upper surface of the flange portion 9a of the sub bearing 9. Thus, the upper surface of the flange portion 9a is subjected to thrust force applied from an upper portion of the roller 10 toward the lower end surface thereof.

An outer diameter of the roller 10 and an inner diameter of the cylinder 5 are different from each other by a predetermined quantity. A crank portion 2a which is eccentric by a quantity corresponding to the predetermined quantity of the difference is integrally formed with an intermediate position of the rotating shaft 2. That is, the crank portion 2a is inserted into an inner support portion 10a provided for the roller 10 so that the roller 10 is eccentrically inscribed with the inner surface of the cylinder 5. The dimensions of the roller 10 are determined in such a manner that a portion of an outer wall of the roller 10 is adapted to changeably contact to portions of the inner surface (inner wall) of the cylinder 5 according to the rotation of the roller 10.

The roller 10 has upper and lower end portions of the inner support portion 10a which are recessed. Thus, the bearing portion 8b of the main bearing 8 is inserted into an upper recess portion 10b of the roller 10 and the bearing portion 9b of the sub bearing 9 is inserted into a lower recess portion 10c thereof.

A helical groove 11 having a substantially helical shape and a substantially rectangular shape in its lateral cross section is formed to the outer wall surface of the roller 10. The helical groove 11 has a pitch which is gradually reduced along the center axial direction of the rotating shaft 2 from the lower end portion of the roller 10 attached to the sub bearing 9 to the upper end portion of the roller 10 attached to the main bearing 8. A blade (helical blade) 12 having a substantially helical shape corresponding to the shape of the helical groove 11 is wound so as to be received in the helical groove 11. The helical blade 12 is adapted to be relatively and slidably inserted into the helical groove 11 and removed therefrom.

The blade 12 is made of an elastic material, a plastic material, a fluororesin, such as teflon, or a fluorine plastic material. The helical blade 12 has an inner diameter which is larger than the outer diameter of the roller 10. That is, the blade 12 is fit in the helical groove 11 such that the diameter of the blade 12 is forcibly reduced. As a result of that, the blade 12 is expanded and deformed so that the outer surface of the blade 12 is always and elastically brought into hermetic contact with the inner surface of the cylinder 5 while the blade 12 and the roller 10 are accommodated together in the cylinder 5.

When the rotating shaft 2 has been rotated, the crank portion 2a is eccentrically rotated so that the roller 10 rotatably supported by the outer surface of the crank portion 2a is eccentrically revolved without rotating around a center axis thereof by a roller-rotation stopper member. According to the eccentrically revolution of the roller 10, the contact portion of the outer surface (outer wall) of the roller 10 to the inner surface of the cylinder 5 is gradually moved along a circumferential direction of the cylinder 5.

When the contact portion of the roller 10 with respect to the cylinder 5 is moved according to the revolution of the roller 10 and thus the contact portion thereof approaches the blade 12, the blade 12 is wholly introduced into the helical groove 11. When the blade 12 is wholly introduced into the helical groove 11, the contact portion of the outer surface of the roller 10 with respect to the inner surface of the cylinder 5 and an end portion of the outer surface of the blade 12 are made to be flush with each other.

When the contact portion of the outer surface of the roller 10 with respect to the inner surface of the cylinder 5 has passed the end portion of the outer surface of the blade 12, the blade 12 projects over the helical groove 11 according to a length between the contact portion of the outer surface of the roller 10 with respect to the inner surface of the cylinder 5 and the end portion of the outer surface of the blade 12. Thus, the length of projection of the blade 12 is maximized at a position opposite to the contact portion of the outer surface of the roller 10 with respect to the inner surface of the cylinder 5 through the axis of the rotating shaft 2 while an angle of 180° is made between the contact portion and the end portion of the blade 12 with respect to the axis of the rotating shaft 2. Then, the blade 12 again approaches the contact portion. Therefore, the foregoing operation in that the blade 12 projects over the helical groove 11 and is introduced thereinto according to the eccentrically revolution of the roller 10 is repeated.

When the cross sections of the cylinder 5 and the roller 10 in the radial direction of the rotating shaft 2 are viewed, since the roller 10 is accommodated eccentrically with respect to the cylinder 5 and a portion of the outer surface of the roller 10 is in contact with the cylinder 5, a crescent-shaped space is formed between the cylinder 5 and the roller 10.

When the crescent-shaped space is viewed in the axial direction of the rotating shaft 2, since the blade 12 is wound along the helical groove 11 and the outer surface of the roller 10 is in contact with the inner surface of the cylinder 5, the crescent-shaped space between the roller 10 and the cylinder 5 is sectioned into a plurality of space portions by the blade 12.

The plurality of space portions are called compression chambers 13. The helical groove 11 is structured in such a manner that the capacity of each compression chambers 13 is gradually reduced along the axial direction of the rotating shaft 2 from the sub bearing side of the compression chamber to the main bearing side of the compression chamber.

One opening end portion of the suction-side refrigerant pipe Pb is joined to a suction opening 14 provided in the lower portion of a side surface of the cylinder 5 and other end portion of the suction-side refrigerant pipe Pb is attached to the side wall of the sealed case 1 so as to hermetically penetrate out of the inside of the sealed case 1. Furthermore, the one opening end portion of the suction-side refrigerant pipe Pb is allowed to face the lowermost side compression chamber 13.

As described above, the position of the suction-side refrigerant pipe Pb and the pitch of the helical groove 11 are determined in such a manner that the lowermost and low-pressure side compression chamber 13 serves as a suction portion 13e and moreover, the uppermost and high-pressure side compression chamber 13 serves as a discharge portion 13f. The discharge portion 13f and the inside portion of the sealed case 1 are communicated to each other through a recess portion 15 formed in the flange portion 8a of the main bearing 8 and having an opening upper surface and a gas discharge hole 16 which penetrates a bottom surface of the recess portion 15 and the lower surface of the flange portion 8a.

That is, while the refrigerant, which is compressive fluid, is helically moved along the axial direction of the rotating shaft 2 from the low-pressure side compression chamber 13e, the refrigerant is successively compressed through the compression chambers 13 so that the refrigerant having high pressure is discharged from the high-pressure side compression chamber 13f so as to flow into the gas discharge hole 16.

The roller-rotation stopper member 17, such as Oldham mechanism and so on, projecting over the end surface of the roller 10 is disposed and inserted to penetrate the recess portion 15 and the gas discharge hole 16. The existence of the roller-rotation stopper member 17 causes the roller 10 to perform only a revolution movement while the rotation movement of the roller 10 around the center axis thereof is inhibited.

Incidentally, a wear of the blade 12 can be prevented, the roller-rotation stopper member 17 may be omitted. In this case, the roller 10 rotates around the center axis thereof while revolving.

A single recess groove 18 is formed along the peripheral surface of the lower recess 10c of the roller 10 so that a seal ring 19 is inserted into the groove 18. The seal ring 19 seals the high pressure gas in the roller 10 and the low-pressure suction opening 14 so as to prevent gas leakage.

A lower end of the rotating shaft 2 projects downwards from the flange portion 9a. In order to correct the weight unbalance caused from the rotation of the rotating shaft 2, a first balancer 20 is attached to a side surface of the lower projecting end portion of the rotating shaft 2. Moreover, the first balancer 20 and the lower projecting end portion of the rotating shaft 2 are covered with a thrust plate 21 which is joined to the lower end portion of the cylinder 5. That is, the thrust plate 21 closes the lower end opening portion of the cylinder 5.

On the other hand, an oil accumulating portion 22 for accumulating lubricating oil 22A is formed in the inner bottom portion of the sealed case 1. A portion of the compression unit 3 is immersed in the lubricating oil 22A in the oil accumulating portion 22. The above thrust plate 21 prevents introduction of the lubricating oil 22A into the hermetic joining space of the first balancer 20.

The rotating shaft 2 has oil supply passages (not shown) for guiding the lubricating oil 22A in the oil accumulating portion 22 to slide portions between the rotating shaft 2 and the sub bearing 9, between the crank portion 2a and the inner support portion 10a of the roller 10, between the rotating shaft 2 and the main bearing 8, between the roller 10 and the cylinder 5 and between the blade 12 and the helical groove 11.

On the other hand, the motor unit 4 adapted to the above-mentioned helical blade compression unit 3 has a rotor 23 joined to the rotating shaft 2 and a stator 24 disposed apart from an outer peripheral surface of the rotor 23 for a predetermined gap and fitted in the sealed case 1.

Although the rotor 23 and the stator 24 have the same lengths along the axial direction, the rotor 23 is joined to the rotating shaft so that the rotor is shifted upwards with respect to the stator 24. That is, the rotor 23 projects upwards toward the discharge-side refrigerating pipe side opposite to the compression unit side.

The rotor 23 is provided with a plurality of gas guide holes 25 formed along the axial direction such that the plurality of gas guide holes 25 penetrate the rotor 23. A disc member 26 is so disposed at the upper end portion of the rotor 23 as to be apart from the gas guide holes 25 for a predetermined gap and as to be opposite thereto.

A second balancer 27 is mounted on the upper surface of the projecting portion of the rotor 23. The second balancer 27 and the first balancer 20 disposed at the lower end portion of the rotating shaft 2 are adapted to cancel an unbalanced weight of the roller 10 according to the rotation of the rotating shaft 2.

The outer peripheral surface of the stator 24 has a plurality of oil return notch portions 28 formed along the axial direction of the stator 24 so that a gap is formed between the inner wall (inner surface) of the sealed case 1 and the outer peripheral surface thereof.

On the other hand, in this embodiment, the outer diameter Do of the compression unit 3 (the cylinder 5) is smaller than the inner diameter Di of the inner surface portion of the stator 24.

Therefore, when the compression unit 3 and the motor unit 4 are accommodated and attached in the sealed case 1, an upper end portion of the compression unit 3 is inserted into the lower end portion of the inside portion of the stator 24. That is, the upper end portion of the cylinder 5 constituting the compression unit 3 is inserted into the inner surface portion (inside portion) of the stator 24 through a coil end 24a. Since the rotor 23 is so disposed as to be shifted upwards with respect to the stator 24, thereby forming a space a lower side of the rotor 23, the cylinder 5 is inserted into the formed space.

The upper side of the elements constitute the compression unit 3, which are positioned upwards from the flange portion 6, are, together with the cylinder 5, inserted into the stator coil end 24a. The insulating film 7 bonded to the outer surface of the upper portion of the cylinder 5 is adapted to electrically insulate the compression unit 3 from the stator 24 and the stator coil end portion 24a.

According to the helical-blade type helical compressor having the above-mentioned structure, electric power is supplied to the motor unit 4 so that the rotating shaft 2 is rotated integrally with the rotor 23. The rotational force of the rotating shaft 2 is transmitted to the roller 10 through the crank portion 2a so that the roller 10 performs the revolution movement by dint of the roller-rotation stopper member 17.

When the roller 10 performs the revolution movement, the contact portion of the roller 10 with respect to the inner surface of the cylinder 5 is gradually moved. Thus, the blade 12 is introduced into the helical groove 11 and projects therefrom. That is, the blade 12 is moved such that it is projected along the radial direction of the roller 10 from the helical groove 11 and introduced along the radial direction thereof into the helical groove 11.

As a result of the above-mentioned sequential operations, the low pressure refrigerant gas is sucked through the suction-side refrigerant pipe Pb so as to directly be introduced into the low-pressure side compression chamber 13e, which is the suction portion in the cylinder 5. Since the blade 12 has the helical shape, the refrigerant gas is sequentially moved to the upper compressing chambers 13 according to the revolution movement of the roller 10.

Since the capacities of the compressing chambers 13 are gradually reduced along the upward direction from the lower sub bearing side of the compression chamber to the upper main bearing side compression chamber caused by the shape of the pitch of the blade 12, the refrigerant gas is compressed while moving through the compressing chambers 13. Thus, the pressure of the refrigerant gas is raised to a predetermined level in the uppermost and high-pressure side compression chamber 13f.

The high pressure gas is discharged from the high-pressure side compression chamber 13f, which is the discharge portion in the cylinder 5, and the discharged high pressure gas is discharged into the sealed case 1 through the gas discharge hole 16 of the main bearing 8.

The high pressure gas discharged into the sealed case 1 passes through the gas guide holes 25 of the rotor 23 so as to temporarily collide with the disc member 26, whereby the lubricating oil 22A contained in the high pressure gas is separated.

Particularly, since the gas guide holes 25 is provided for the rotor 23 rotating with the rotating shaft 2, it is able to accelerate the high pressure gas and the lubricating oil 22A contained therein so that the high pressure gas and the lubricating oil 22A contained therein collide with the disc member 26. Therefore, the disc member 26 is adapted to reliably separate the oil components having a large weight from the high pressure gas. Since the discharge-side refrigerant pipe Pa joined to the upper portion of the sealed case 1 is positioned directly above the disc member 26, suction of the oil component into the discharge-side refrigerant pipe Pa can reliably be prevented.

The lubricating oil 22A separated by the disc member 26 is returned to the oil accumulating portion 22 formed in the bottom portion of the sealed case 1 through the oil return notch portions 28 provided for the stator 24. The high pressure gas is discharged from the discharge-side refrigerant pipe Pa so as to be introduced into the condenser B. Then, the high pressure gas is again sucked into the compressor A through the expansion valve C and the evaporator D, thereby repeatedly executing the above refrigerating cycle operation.

As described above, the cylinder 5 constituting the compression unit 3 and a portion of the insulating film 7 are inserted into the stator 24 which constitutes the motor unit 4. A portion of the cylinder 5, the main bearing 8 disposed at the upper end portion of the cylinder 5, the roller 10 and a portion of the blade 12 and the insulating film 7 are inserted into the stator coil end 24a which constitutes the motor unit 4.

That is, the compression unit 3 and the motor unit 4 which are connected to each other through the rotating shaft 2 are assembled and arranged such that the compression unit 3 and the motor unit 4 are partially overlapped to each other along the rotating shaft 2. Therefore, the axial length of the helical compressor A of this embodiment can be shortened as compared with a conventional helical compressor having a structure such that the compression unit and the motor unit are simply, serially and separately disposed in the axial direction of the rotating shaft.

Therefore, it is possible to make the size of the sealed case 1 for accommodating the compression unit 3 and the motor unit 4 small and compact, thereby reducing the size of the air conditioner for accommodating the helical compressor A and a space required to install the helical compressor A into the air conditioner.

Moreover, the cylinder 5 constituting the compression unit 3 and a portion of the insulating film 7 are inserted into the stator 24 which constitutes the motor unit 4, making it possible to ensure the high accuracy of the concentricity between the cylinder 5 and the inner surface portion of the stator 24, the high accuracy of the concentricity between the stator 24 and the rotor 23 through the cylinder 5, the main bearing 8, the sub bearing 9 and the rotating shaft 2.

That is, it is possible not to require a complicated aligning process between the center axis of the cylinder 5 and the center axis of the stator 24, and between the center axis of the stator 24 and the center axis of the rotor 23.

The cylinder 5 guides the inside portion of the stator 24, making it possible to uniform an air gap between the stator 24 and the rotor 23, thereby improving the assembling accuracy of the helical compressor A.

Since the outer diameters of the main bearing 8 and the sub bearing 9, and the inner diameter of the cylinder 5 are made to be the same, as well as, the main bearing 8 and the sub bearing 9 are disposed in the cylinder 5, the overall length of the compression unit 3 can be shortened.

In actual, the main bearing 8 and the sub bearing 9 are secured to the cylinder 5 by welding using a laser beam applied from the outside of the cylinder 5. At this welding operation, in this embodiment, the main bearing 8 and the sub bearing 9 are temporarily fixed in the cylinder 5, heat input required when performing the welding operation can be minimized. As a result of that, deformation of the cylinder 5 can be prevented.

That is, the cylinder 5 having a thin wall is sufficient to realize required rigidity and no bolt is required in the assembling process of the compression unit 3 and the main and sub bearings 8 and 9. Thus, the axes of the cylinder 5 and the bearings 8 and 9 can easily be made coincide with each other so that the assembling process of the compression unit 3 and the main and sub bearings 8 and 9 can be simplified and the cost required for the assembling process can be reduced.

Since the upper end portion of the cylinder 5 is inserted into the inner surface portion of the stator 24, the high pressure gas discharged from the high-pressure side compression chamber 13f can completely be introduced into the gas guide holes 25 formed in the rotor 23 through the gas discharge hole 16.

At that time, the inner surface of the stator 24 serves as a rotor cover so that the predetermined spaces are formed between the inner surface of the stator 24 and the main bearing 8 and between the stator 24 and the rotor 23. Since the spaces have muffler effects, noise caused from discharge of the refrigerant gas can be prevented.

Even if the oil level in the oil accumulating portion 22 of the sealed case 1 is raised to the lower end portion of the stator 24 because the refrigerant in a large quantity is mixed with the lubricating oil 22A in the oil accumulating portion 22, by the effect of the rotor cover, it is possible to prevent the lubricating oil 22A from being sucked into the cylinder 5.

The insulating film 7 made of a non-conductive material is wound around the cylinder 5 so that the compression unit 3 and the motor unit 4 are electrically insulated from each other. Therefore, the compression unit 3 and the motor unit 4 can be disposed adjacently as much as possible.

Since the seal ring 19 is assembled to permit a little leakage, the lubricating oil 22A retained in the inner surface of the roller 10 and the lubricating oil leaked from the sub bearing 9 to the space for joining the first balancer 20 are adapted to leak into the lower-pressure side compression chamber 13e, that is, the suction portion 13e through the lower surface of the roller 10.

Therefore, the lubricating oil 22A leaked into the suction portion 13e seals and lubricates the clearance portion between the blade 12 and the outer surface of the roller 10, which are disposed in the cylinder 5, and the inner surface of the cylinder 5, thereby preventing gas leakage and wear in the cylinder 5.

The lower end portion of the rotating shaft 2 projects downwards from the flange portion 9a of the sub bearing 9 and the first balancer 20 is mounted to the lower projecting portion of the rotating shaft 2, making it possible to effectively cancel the eccentric weight of the roller 10.

First and second modifications of the first embodiment of the present invention will now be described with reference to FIGS. 2 and 3. Incidentally, in a case where elements of the first and second modifications of the first embodiment are the same as corresponding elements of FIG. 1, same reference characters in FIG. 1 are assigned to the same elements in FIGS. 2 and 3 and description of the same elements in FIGS. 2 and 3 are omitted.

Figure 2:
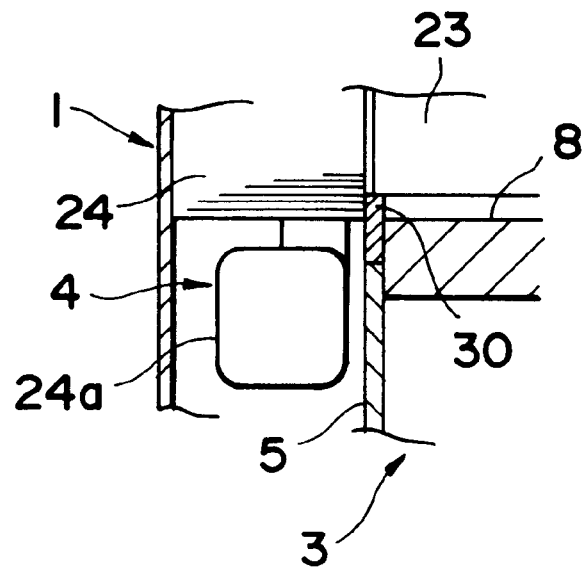
FIG. 2 is a partially vertical cross sectional view showing a portion of a first modification of a helical compressor according to the first embodiment.

In the first modification of the first embodiment, as shown in FIG. 2, a portion of the cylinder 5 which is supported by the stator 24 is changed to a non-magnetic ring 30 made of non-magnetic materials, for example, stainless steel or aluminum. Thus, an adverse influence on the electromagnetic characteristic of the motor unit 4, that is caused when inserting the compression unit 3 into the motor unit 4, can be satisfactory prevented.

In addition, it is possible to use a ring 30' made of non-conductive materials, such as elastic material thereby gaining the same effect of the first modification of the first embodiment.

Figure 3:
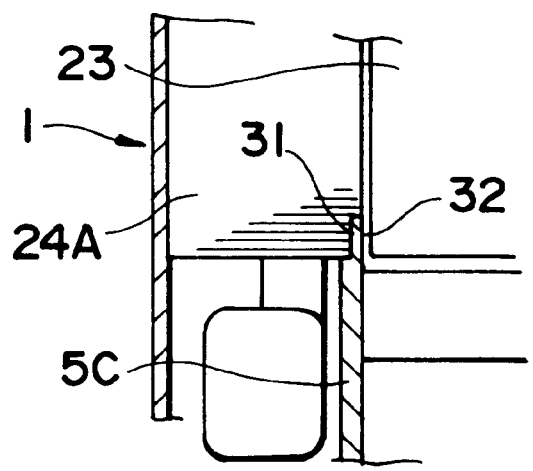
FIG. 3 is a partially vertical cross sectional view showing a portion of a second modification of a helical compressor according to the first embodiment.

According to the second modification of the first embodiment, as shown in FIG. 3, a stator 24A may have a stepped and recessed portion 31 formed at the lower end portion of the inner surface thereof. A cylinder 5C has a stepped and projecting portion 32 corresponding to the stepped and recessed portion 31, which projects toward the stator 24A. The stepped projecting portion of the cylinder 5C is engaged to the stepped and recessed portion 31. In the structure of the second modification of the first embodiment, since the inner diameters of the stator 24A and the cylinder 5C are made to be the same, the rotor 23 can correctly be adapted to be opposite to the stator 24A without contacting the rotor 23 with the cylinder 5C. As a result of that, deterioration in the electric characteristic can be prevented.

According to the stepped and recessed portion 31 of the stator 24A and the stepped and projecting portion 32 of the cylinder 5C, a depth of inserting the cylinder 5C into the stator 24A is equally determined, thereby improving the insertion accuracy and the manufacturing easiness (assembling easiness) of the helical compressor.

Second embodiment of the present invention will now be described with reference to FIG. 4. Incidentally, same reference characters of the elements in FIG. 1 are assigned to the elements in FIG. 4, which are the same as the elements in FIG. 1, and description of the same elements in FIG. 4 are omitted.

Figure 4:
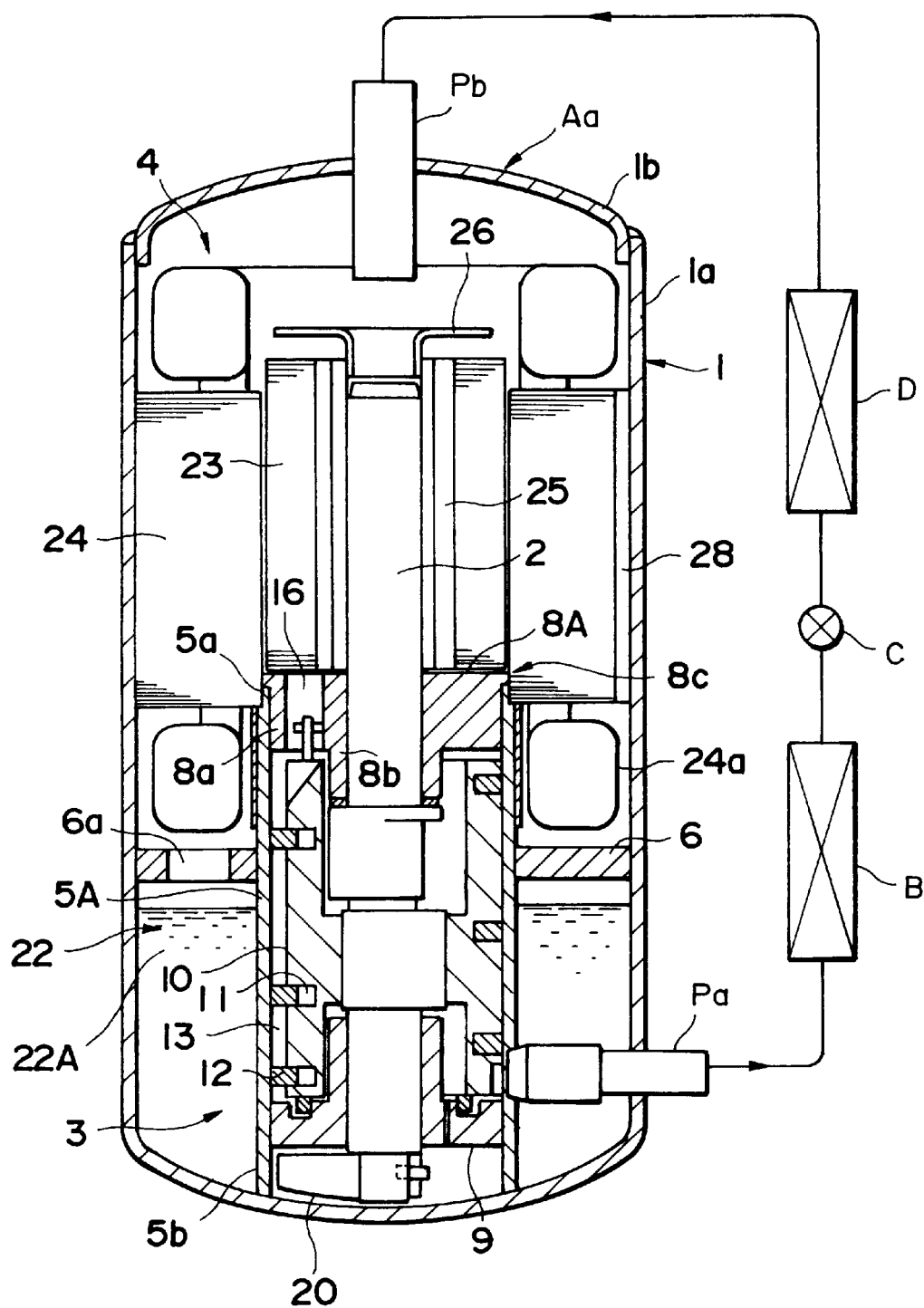
FIG. 4 is a vertical cross sectional view showing a second embodiment of a helical compressor according to the present invention.

The helical compressor Aa shown in FIG. 4 has the sealed case 1 in which low pressure gas introduced from the refrigerating cycle RC is filled, while the helical compressor A shown in FIG. 1 has the sealed case 1 in which high pressure gas discharged from the discharge portion 13f is filled.

That is, the refrigerant gas introduced from the evaporator D flows from the suction-side refrigerant pipe Pb connected to the upper end portion of the sealed case 1 into the gas guide holes 25 provided for the rotor 23 through a gap between the disc member 26 and the rotor 23 in the sealed case 1.

Then, the refrigerant gas is sucked from the gas discharge hole 16 provided for a main bearing 8A, which is described later, into a compression chamber 13 of a cylinder 5A having a structure different from that shown in FIG. 1. Thus, the refrigerant gas sucked into the compression chamber 13 is sequentially helically moved so as to be compressed.

Since the pitch of the helical groove 11 provided for the roller 10 is gradually reduced along the center axial direction of the rotating shaft 2 from the upper end portion of the roller 10 attached to the main bearing 8 to the lower end portion of the roller 10 attached to the sub bearing 9.

Therefore, when the refrigerant gas is discharged from the lower compression chamber 13, the pressure of the refrigerant gas has been raised to a predetermined level. The high pressure gas is discharged from the discharge-side refrigerant pipe Pa disposed on the side surface of the lower portion of the sealed case 1 into the condenser B so that the refrigerating cycle is constituted.

The main bearing 8A comprises a flange portion 8a and a bearing portion 8b having an outer diameter which is smaller than that of the flange portion 8a and so arranged as to extend downwards from the flange portion 8a along the axial direction of the rotating shaft 2, wherein the flange portion 8a and the bearing portion 8b are fitted and inserted into the cylinder 5A. Moreover, the main bearing 8A comprises an attachment portion 8c projecting from the flange portion 8b over the top end portion 5a of the cylinder 5A and inserted and fitted into the inner surface portion of the stator 24.

Since the main bearing 8A having rigidity is inserted into the inner surface portion of the stator 24, deformation of the cylinder 5A, that is caused when the cylinder 5A and the main bearing 8A are inserted into the stator 24, can satisfactorily be prevented. Moreover, the length of the rotating shaft 2 rotatably supported by the bearing 8b can be elongated.

As a result of that, the rotating shaft 2 can furthermore accurately be rotatably supported.

On the other hand, a lower end portion 5b of the cylinder 5A is as it is extended downwards so as to be brought into contact with the bottom surface of the sealed case 1. The end of the rotating shaft 2 projects from the lower end (bottom) surface of the sub bearing 9 so that the first balancer 20 is attached to the side surface of the projecting end portion of the rotating shaft 2. Therefore, the first balancer 20 is disposed in a hermetic space formed by the cylinder 5A, the sealed case 1 and the sub bearing 9.

The circumference of the lower end portion 5b of the cylinder 5A which is in contact with the bottom surface of the sealed case 1 is welded from outside of the sealed case 1. The compression unit 3 is supported by three portions, which are the inner surface of the stator 24 through the upper end portion 5a of the cylinder 5A, the sealed case 1 through the flange portion 6 and the bottom surface of the sealed case 1 through the lower end portion of the cylinder 5A. Thus, the aligning process can easily be performed.

In this the helical compressor Aa having the sealed case 1 in which low pressure gas introduced from the refrigerating cycle RC is filled, undesirable suction of fluid into the cylinder 5A can effectively be prevented. That is, if a fluid component is contained in the refrigerant introduced from the suction-side refrigerant pipe Pb connected to the upper portion of the sealed case 1 positioned directly above the disc member 26, the fluid refrigerant having a large weight cannot easily pass between the disc member 26 and the rotor 23.

On the other hand, a dry gas component contained in the refrigerant and having a small weight is able to easily pass through the gas guide holes 25 provided for the rotor 23 so as to be sucked into the compression chamber 13 in the cylinder 5A. In the compression chamber 13, a so-called fluid separation effect is obtained so that a liquid hammering phenomenon in the cylinder 5A can be prevented. Thus, the reliability of the helical compressor Aa can be improved.

First and second modifications of the second embodiment of the present invention will now be described with reference to FIGS. 5 and 6.

Figure 5:
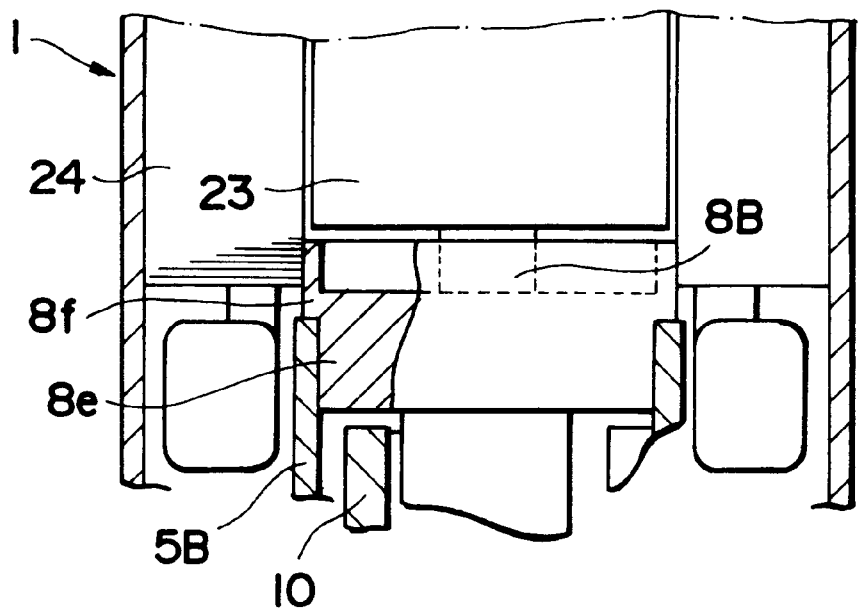
FIG. 5 is a partially vertical cross sectional view showing a portion of a first modification of a helical compressor according to the second embodiment.
Figure 6:
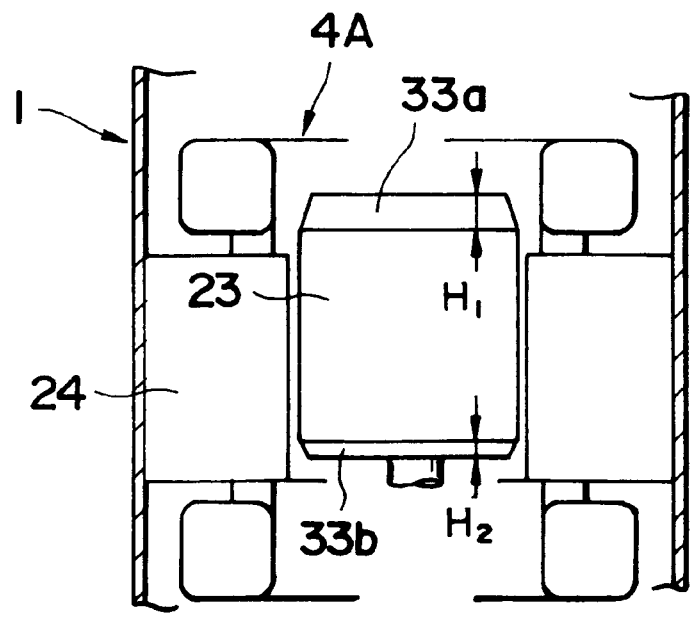
FIG. 6 is a partially vertical cross sectional view showing a portion of a second modification of a helical compressor according to the second embodiment.

Incidentally, same reference characters of the elements in FIG. 4 are assigned to the elements in FIGS. 5 and 6, which are the same as the elements in FIG. 4, and description of the same elements in FIGS. 5 and 6 are omitted.

As shown in FIG. 5, a main bearing 8B comprises a flange portion and bearing portion 8e which is fitted and inserted into the cylinder 5B and an attachment portion 8f projecting and extending integrally from the outer peripheral edge portion of the flange portion and bearing portion 8e and inserted and fitted into the inner surface portion of the stator 24. That is, the cylinder 5B is fitted to the flange portion and bearing portion 8e of the main bearing 8b and the attachment portion 8f of the main bearing 8b is inserted and fitted into the stator 24 so as to be supported thereby.

As described above, the attachment portion 8f of the main bearing 8b serves as a rotor cover so that a predetermined space is formed between the inner surface of the attachment portion 8f and the rotor 23. Since the sucked refrigerant adapted to pass through the rotor 23 is introduced into the space, the refrigerant can be sucked in a sufficiently large quantity. Because the sucking efficiency can be improved, the refrigerating performance and the compressing performance of the helical compressor Aa can be improved.

When the structure of the helical compressor Aa shown in FIG. 5 is applied to the structure of the helical compressor having the sealed case in which high pressure gas discharged from the discharge portion is filled, the attachment portion 8f serves as the rotor cover and a predetermined space is formed between the inner surface of the attachment portion 8f of the main bearing 8B and the rotor 23. By the muffler effect of the space, it is possible to prevent noise caused from discharge of the refrigerant gas.

Even in a case where the oil level in the oil accumulating portion 22 of the sealed case 1 is raised to the lower end portion of the stator 24 because the refrigerant in a large quantity is mixed with the lubricating oil 22A in the oil accumulating portion 22, by the effect of the rotor cover effect, it is possible to prevent lubricating oil 22A from being sucked through the gas suction hole (the discharge hole in a case of the structure having the high pressure in the sealed case).

When an AC motor is employed as the motor unit 4A as shown in FIG. 6, rotor end rings 33a and 33b are formed at two vertical end portions, such as upper end portion and lower end portion, of the rotor 23. The upper and lower rotor end rings 33a and 33b have thickness H1 and H2, respectively, and the thickness H1 and H2 of the rotor end rings 33a and 33b are made to be different from each other. The lower end ring 33b opposite to the compression unit 3, which is not shown in FIG. 6, has a small thickness as compared with the thickness H2 of the upper end ring 33a (H1>H2) so as to keep a sufficiently large space through which the compression unit 3 is inserted into the stator 24. Thus, the upper rotor end ring 33a can be thickened.

Figure 7:
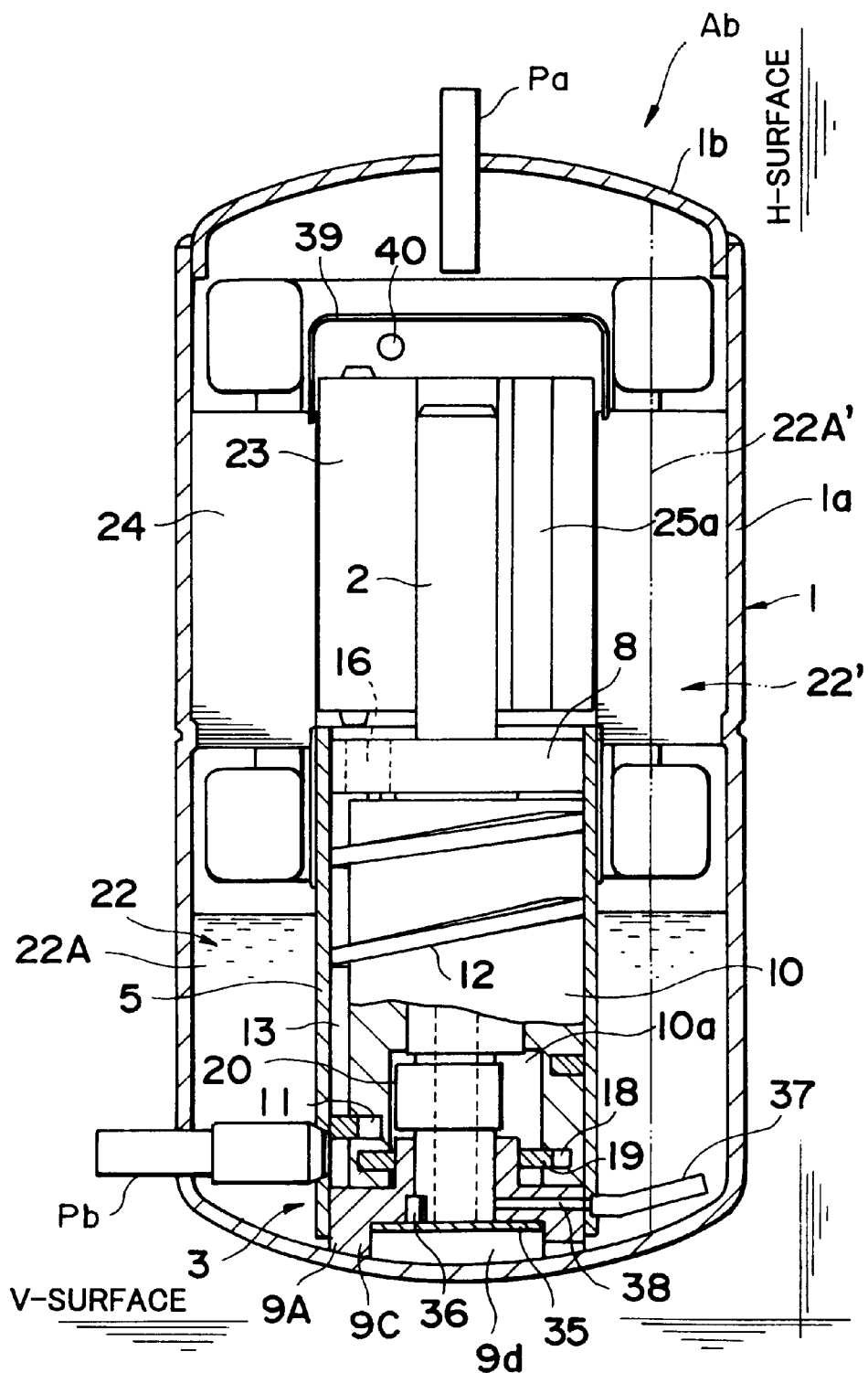
FIG. 7 is a vertical cross sectional view showing a third embodiment of a helical compressor according to the present invention.

Third embodiment of the present invention will now be described with reference to FIG. 7. Incidentally, same reference characters of the elements in FIG. 1 are assigned to the elements in FIG. 7, which are the same as the elements in FIG. 1, and description of the same elements in FIG. 7 are omitted. In addition, the other elements constituting the refrigerating cycle except for a helical compressor of this embodiment is omitted.

As shown in FIG. 7, the helical compressor Ab has the sealed case 1 in which the high pressure gas discharged from the discharge portion 13f is filled.

In this embodiment, a sub bearing 9A fixedly fitted to the lower opening portion of the cylinder 5 has a sub-bearing flange portion 9c projecting from the opening end portion of the cylinder 5 so as to be supported by the bottom portion of the sealed case 1. The sub-bearing flange portion 9c is secured to the sealed case 1 by a laser welding means from the outside of the sealed case 1.

Therefore, the compression unit 3 is supported by the bottom portion of the sealed case 1 through the sub bearing 9A. In particular, inclination of the cylinder 5 with respect to the sealed case 1 can be prevented by the sub bearing 9A.

The lower end surface of the sub bearing 9A which is brought into contact with the sealed case 1 is recessed except for the outer peripheral portion. A thrust plate 35 is attached to the bottom surface of the recess portion 9d. Moreover, a general capacity type oil pump 36 is disposed on the bottom surface of the recess portion 9d. An oil pipe 37 is connected to the outer peripheral surface of the lower end portion of the cylinder 5 so as to be communicated to an oil guide hole 38 formed from the cylinder 5 and the outer peripheral surface of the sub-bearing flange portion 9c to the inner peripheral surface thereof rotatably supporting the rotating shaft 2. That is, the oil guide hole 38 is penetrated from the inside portion of the sub bearing 9A through the subbearing flange portion 9c to the oil accumulating portion 22 and communicated to the oil pipe 37.

A rotor cover 39 is mounted onto the upper surface of the stator 24. The rotor cover 39 is formed into a substantially semi-spherical and bowl shape facing downwards to cover the upper surface of the rotor 23 such that a predetermined gap is provided. A gas removal hole 40 is formed in the outer surface of the rotor cover 39. That is, the rotor cover 39 is formed into a semi-hermetic cover.

By employing the above-mentioned structure of the helical compressor Ab, it is possible to use the helical compressor Ab not only as the vertical type helical compressor which is set on a V-surface parallel to the horizontal surface so as to arrange the center axial direction of the helical compressor (longitudinal direction thereof) is orthogonal to the V-surface, thereby disposing the discharge-side refrigerant pipe Pa above the helical compressor, but also as the horizontal type helical compressor which is set on a H-surface parallel to the horizontal surface so as to arrange the center axial direction of the helical compressor (longitudinal direction thereof) is parallel to the H-surface, thereby disposing the suction-side refrigerant pipe Pb is disposed above the helical compressor in the lower portion.

That is, in either of the vertical type compressor or the horizontal type compressor, the low pressure gas is sucked from the suction-side refrigerant pipe Pb. When the low pressure gas is compressed to a predetermined pressure level in the compression chambers 13, the high pressure gas is discharged through the gas discharge hole 16 of the main bearing 8.

Then, the high pressure gas passes through the gas guide hole 25a provided for the rotor 23 to reach the rotor cover 39. Then, the high pressure gas is discharged through the gas removal hole 40 of the rotor cover 39 into the space formed between the end surface of the sealed case 1 on which the discharge-side refrigerant pipe Pa is attached and the motor unit 4 so as to be introduced into the discharge-side refrigerant pipe Pa.

When the compressor Ab is employed as the horizontal type compressor, the oil pipe attachment side of the inner surface of the sealed case 1 is an inner bottom surface so that the oil accumulating portion 22' is formed between the compression and motor units 3 and 4, and the inner bottom surface of the sealed case 1. The oil pipe 37 and a portion of the stator 24 are immersed in the lubricating oil 22A'. When the rotating shaft 2 has been rotated, the oil pump 36 is operated to suck lubricating oil 22A' through the oil pipe 37. Then, lubricating oil 22A' is supplied to an oil supply passage (not shown) formed in the outer surface of the rotating shaft 2. The foregoing oil supply structure is also applied to the vertical type compressor.

In a case where the compressor Ab is employed as the horizontal type compressor, a problem of interference between the level of the lubricating oil 22A' and the rotor 23 may be arisen when the rotor 23 is rotated. That is, if a fluid back phenomenon of the refrigerant may take place when, for example, the operation of the horizontal type compressor is started, the influence of the fluid refrigerant may cause the oil level to be raised. Thus, a portion of the rotor 23 may be immersed in the refrigerant, whereby there may be apprehension that lubricating oil 22A' leaks in a large quantity.

However, in the horizontal type compressor as shown in FIG. 7, the compression unit 3 is directly secured to the inner surface of the stator 24 and the rotor cover 39 is disposed at the upper end portion of the stator 24 so as to close the upper surface of the rotor 23, making it possible to prevent the interference between the rotor 23 and the oil level of the lubricating oil 22A'. As a result of that, undesirable discharge of lubricating oil 22A' can be prevented.

The rotor 23 has the gas guide hole 25a mounted to one portion thereof and having a diameter larger than that of the gas guide holes 25 shown in FIG. 1. Moreover, the gas guide hole 25a is disposed in the same radial direction as that of the eccentric portion of the rotating shaft 2 to which the roller 10 of the rotating shaft 2 is joined.

Other portion of the rotor 23 symmetrically opposite, with respect to the center axis thereof, to the one portion along the radial direction to which the gas guide hole 25a is mounted has a weight which is enlarged as compared with that of the one portion of the rotor 23. Therefore, an effect substantially similar to that obtainable from the structure that a balancer is provided for the eccentric portion of the rotating shaft 2 can be obtained.

That is, the necessity of providing another balancer (an element) for the rotor 23 can be eliminated. The rotor 23 itself and the first balancer 20 disposed in the recess portion 10a at the lower end of the roller 10 have an effect of canceling the eccentric weight of the roller 10.

One example of a method (process) of assembling the helical compressors, particularly, the helical compressor Ab of the third embodiment, which has the above-mentioned structure, will now be described.

Figure 8:
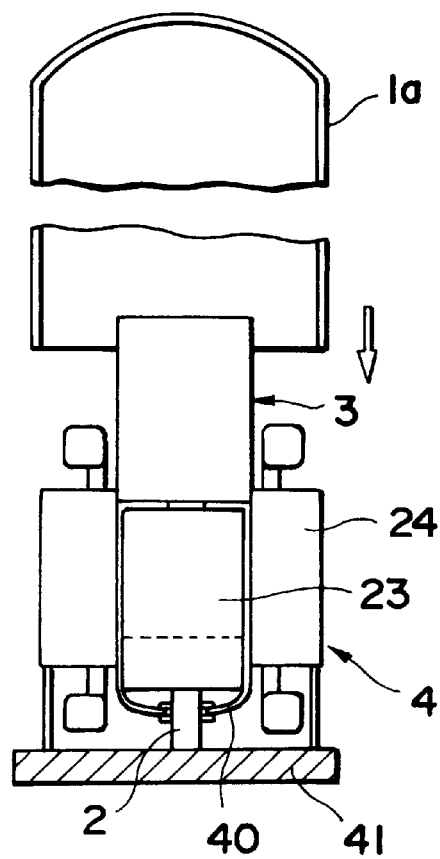
FIG. 8 is a view for explaining a process of assembling the helical compressor according to the third embodiment.

As shown in FIG. 8, one end portion of the rotating shaft 2 is inserted into the rotor 23 so that the rotating shaft 2 and the rotor 23 are previously integrated by shrink fit processor the like. A gap gauge 40 is attached to the outer peripheral surface of the lower portion of the rotor 23 so as to cover the lower portion thereof. The rotor 23 having the rotating shaft 2 and the gap gauge 40 is inserted through one end portion of an inner surface portion of the stator 24 into the inner surface portion thereof, other end of the inner surface portion of the stator 24 being supported by a jig 41. Then, the compression unit 3 is inserted into the one end portion of the inner surface of the stator 24 so that the rotating shaft 2 is inserted through the main bearing 8, the sub bearing 9 and the roller 2 of the compression unit 3, whereby the compression unit 3 and the motor unit 4 are partially overlapped to each other along the rotating shaft 2. The thickness of the gap gauge 40 is substantially the same as a so-called air gap between the outer peripheral surface of the rotor 23 and the inner surface portion of the stator 24.

On the other hand, the case body 1a and the cap member 1b are previously manufactured and prepared so that the inner diameter of the case body 1a is somewhat smaller than the outer diameter of the stator 24. At this time, at least the outer peripheral surface of the case body 1a is heated and thus the outer diameter of the outer peripheral surface thereof is enlarged. The case body 1a is fit to the outer peripheral surface of the stator 24, thus performing the so-called shrink fit process. After the case body 1a fitted to the outer peripheral surface of the stator 24 has been left for a predetermined time, the temperature of the case body 1a is lowered, whereby the stator 24 is fixedly mounted to the case body 1. Since the sub bearing 9 is in contact with the end surface of the case body 1a in the above-mentioned state, the contact portion of the sub bearing 9 to the case body 1a is welded with a laser beam.

Then, the integrated assembly is removed from the jig 41, and then the gap gauge 40 is removed from the integrated assembly. Then, pipes including the discharge pipe Pa and the suction pipe Pb are inserted into the case body 1a and attached thereto. Moreover, the cap member 1b is hermetically attached to the case body 1a so as to cover the opening end portion thereof, thereby completing the process for assembling the helical compressor Ab.

Other compressors shown in the above embodiments are able to be assembled by the same assembling process of the helical compressor Ab.

In addition, after the case body 1a of the sealed case 1 is shrink-fitted to the stator 24, the shrink-fitted assembly is left at ambient temperature. Therefore, the case body 1a of the sealed case 1 is cooled so that the clamping force of the case body 1a reduces the inner diameter of the stator 24. Since the both end surfaces of the stator 24 have weak rigidity, the both end surfaces are shrunken in a large quantity. A fact is known that the inner diameter of the stator 24 is reduced by substantially 0.05 mm to 0.15 mm when the inner diameter of the sealed case 1 is 100 mm.

As a result of the above-mentioned characteristic, while the compression unit 3 is secured by the inner surface portion of the stator 24, a state so-called fixedly fit is realized. Thus, the compression unit 3 and the motor unit 4 can easily be secured to each other so as to be overlapped thereto without employing means, for example, welding with which there is apprehension that an influence of thermal deformation is exerted.

Since the gap gauge 40 is inserted into the air gap of the motor unit 4 at a position opposite to the rotor 23, the state of coincidence between the outer surface of the rotor 23 and the inner surface of the stator 24 is maintained.

The compression unit 3 is secured to the sealed case 1 at the bottom portion thereof which is apart from the shrinking position and which is not substantially affected by the change of the inner diameter of the sealed case 1, and the securing process between the compression unit 3 and the sealed case 1 is performed after the reduction of the inner diameter of the sealed case 1 has been caused. Therefore, the securing process between the compression unit 3 and the sealed case 1 is not affected by the accuracy of the sealed case 1 and by the change caused from the shrink-fit process.

Figure 9:
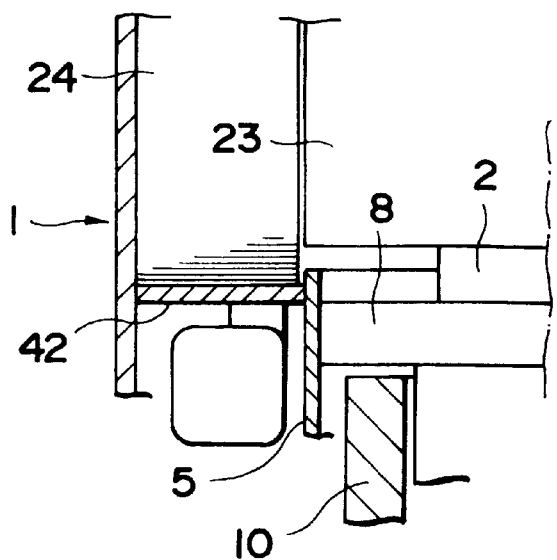
FIG. 9 is a partially vertical cross sectional view showing a portion of a modification of the helical compressor according to the third embodiment.

In a modification of the third embodiment, as shown in FIG. 9, a thick end plate 42 having an opening central portion having a diameter as well as that of the inner surface portion of the stator 24 may be joined to the lower end surface of the stator 24 so as to insert the cylinder 5 of the compression unit 3 into the opening portion of the end plate 42. If the accuracy of the inner diameter of the opening portion of the end plate 42 is improved, the concentricity between the assembled stator 24 and the rotor 23 can be improved. If the rigidity of the end plate 42 can be strengthened, force for supporting the compression unit 3 can furthermore be enlarged.

Figure 10:
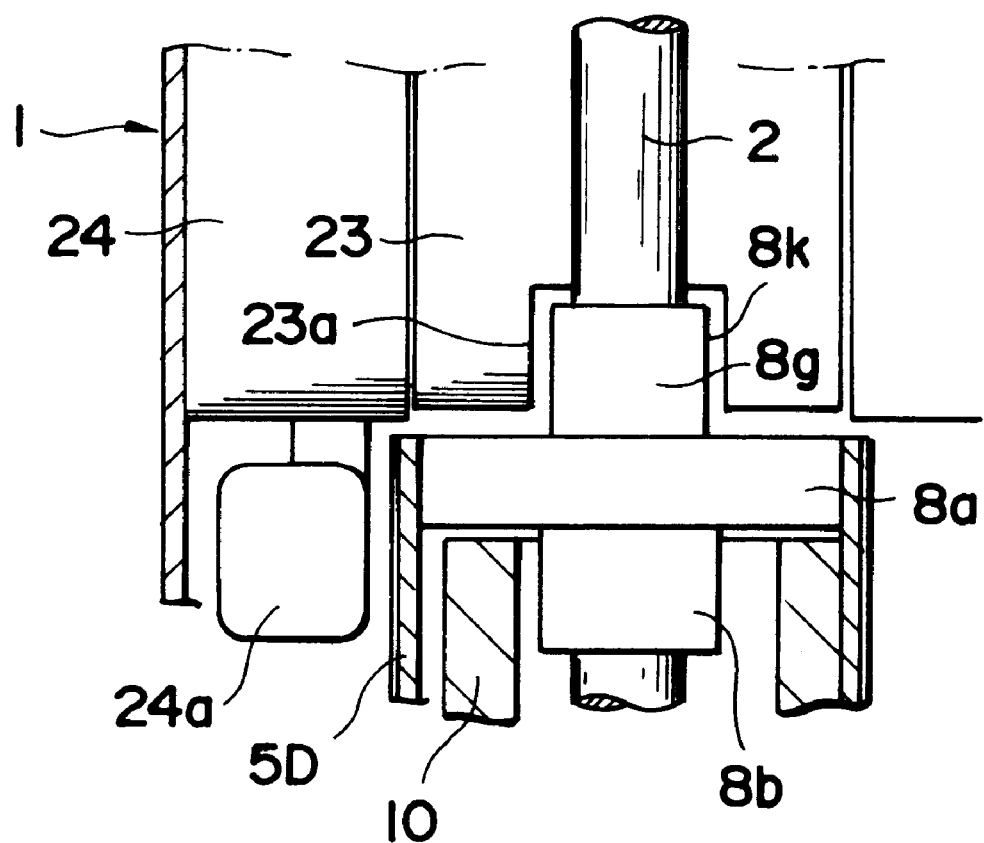
FIG. 10 is a partially vertical cross sectional view showing a portion of another modification of the helical compressor according to the third embodiment.

Moreover, in another modification of the third embodiment, as shown in FIG. 10, the necessity of inserting the cylinder 5D or the main bearing 8C into the inner surface portions of the stator 24 may be eliminated. The end of the cylinder 5D may be required to be inserted into at least the coil end 24a of the stator 24.

In this modification, a bore portion 23a is formed in the lower end portion of the rotor 23 and a boss portion 8g for supporting the rotating shaft 2 integrally extending from the flange portion 8a of the main bearing 8K along the axial direction is provided in the bore portion 23a. Therefore, by the boss portion 8g, it is possible to extend a length of the support portion of the main bearing 8K which rotatably supports the rotating shaft 2, thereby stably rotatably supporting the rotating shaft 2.

Fourth embodiment of the present invention will now be described with reference to FIG. 11.

Figure 11:
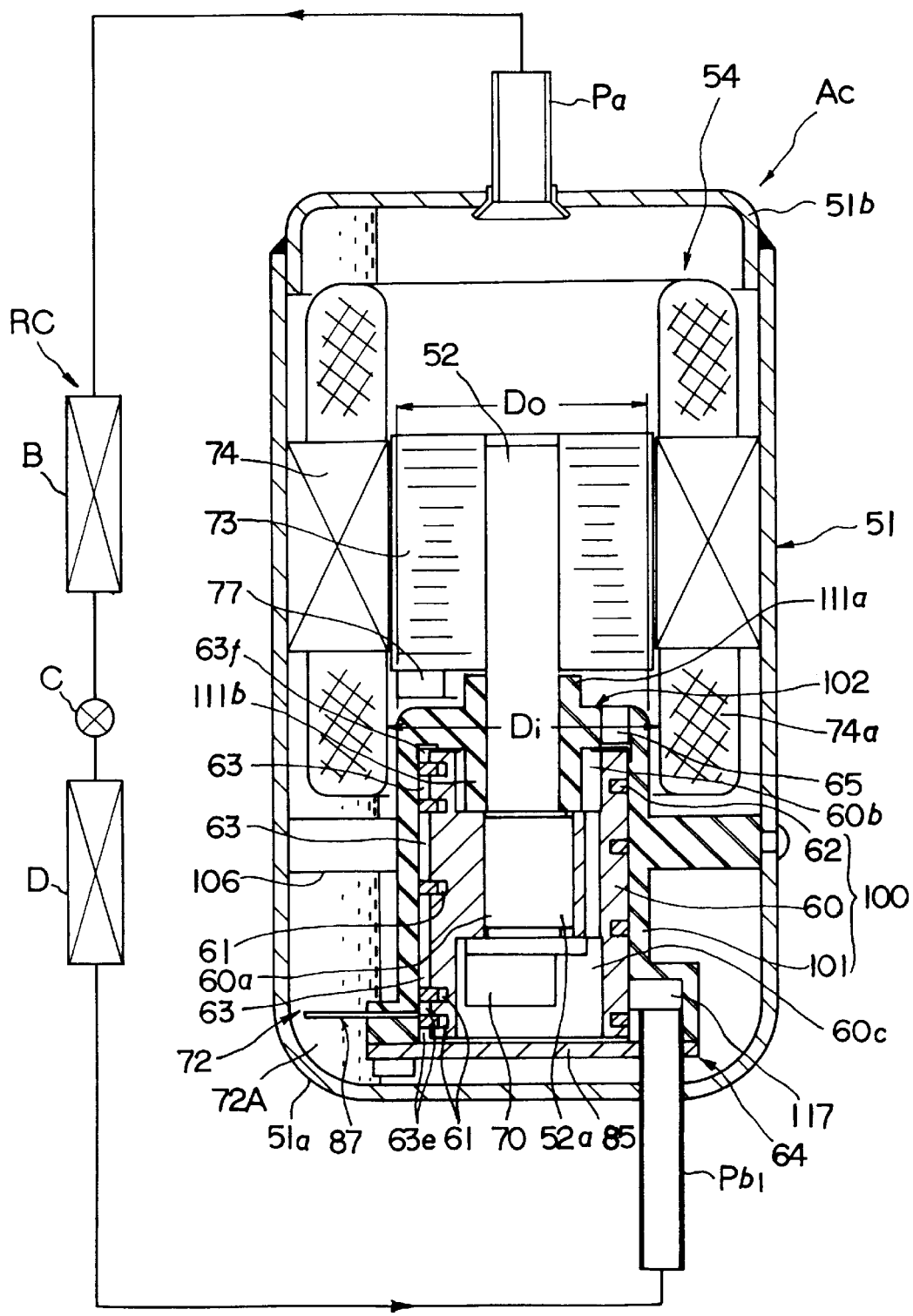
FIG. 11 is a vertical cross sectional view showing a fourth embodiment of a helical compressor according to the present invention.

FIG. 11 is a vertical cross sectional view showing this embodiment of the helical compressor according to the present invention. Incidentally, since the reference characters (numerals) of the elements in FIG. 1 of the first embodiment added to fifty (50) are set to reference characters (numerals) of elements of this embodiment in FIG. 11, which are substantially the same with the elements of the first embodiment, respectively, description of the elements in FIG. 11 which correspond to the elements shown in FIG. 1 are omitted or simplified.

As shown in FIG. 11, similar to the first embodiment, a helical compressor Ac, which is a vertical type compressor, constitutes the refrigerating cycle RC of, for example, the air conditioner.

The vertical type helical compressor Ac has a sealed case 51 which accommodates a helical blade compression unit 100 and a motor unit 54 connected each other through a rotating shaft 52.

In this embodiment, the compression unit 100 comprises a cylinder 101 having a structure different from that of the first embodiment and a single bearing 102 having a structure different from the structures of the main bearing 8 of the first embodiment. That is, in this embodiment, the compression unit 100 comprises the cylinder 101, a roller 60 and a helical blade 62. The cylinder 101 has a flange portion 106 and the flange portion 106 is secured to the inner surface of the sealed case 51.

The rotating shaft 52 is rotatably supported by the single bearing 102, corresponding to the main bearing of the first embodiment, which is inserted into the upper recess portion 60b of the roller 60. The single bearing 102 is adapted to close an upper end portion of the cylinder 101. The single bearing 102 has boss portions 111 (lower boss portion 111a, upper boss portion 111b) projecting along the axial direction of the rotating shaft 52 over upper and lower sides of the single bearing 102 for supporting the rotating shaft 52, respectively. The boss portions 111 constitute a sliding portion of the bearing 102. An lower end portion of the crank side of the lower boss portion 111b is adapted to extend to a position adjacent to the crank portion 52a of the rotating shaft 52. While an upper end portion of the rotor side of the upper boss portion 111a is adapted to extend to a position adjacent to the rotor 73 of the motor unit 54. Thus, the axial length of the boss portions 111, that is, the length of the sliding portion of the bearing 102 is maintained. The bearing 102 is integrally formed with the upper end portion of the cylinder 101, the bearing 102 being disposed between the roller 60 and the rotor 73.

In the helical compressor Ac, similar to the first embodiment, since the roller 60 performs revolution movement by dint of the rotation of the rotating shaft 52, there are provided with a first balancer 70 and second balancer 77. The first balancer 70 is integrally attached to the lower end portion of the rotating shaft 52 projecting in the lower recess portion 60c, which is opposite to the bearing side with respect to the crank portion 52a of the rotating shaft 52.

Similarly, a second balancer 77 is attached to the lower end portion of the rotor 73 adjacent to the cylinder 101. The first and second balancers 70 and 77 prevent weight unbalance caused from rotations of the rotating shaft 52 so that weight balance is maintained.

In this embodiment, similar to the first embodiment, the outer diameter Do of the cylinder 101 and the bearing 102 is smaller than the inner diameter Di of the coil end (winding) 74a of the stator 74 of the motor unit 54. When the helical compression unit 100 and the motor unit 54 have been loaded into the sealed case 51, an upper portion of the cylinder 101 and the bearing 102 are thus accommodated in the coil end 74a of the stator 74 of the motor unit 54. That is, since the motor unit 54 and the helical compression unit 100 are partially overlapped each other, the axial length of the helical compressor Ac is shortened. Therefore, the size of the helical compressor can be reduced.

On the other hand, a lower end portion (bottom portion) of the cylinder 101 is closed by a thrust plate 85 which is an end plate. Thus, the cylinder 101 and the thrust plate 85 form an introduction chamber 117 serving as a suction chamber. The introduction chamber 117 is adapted to communicate with a low-pressure side compression chambers 63e.

A suction-side refrigerating pipe Pb1 is attached so as to hermetically penetrate in the bottom wall thereof to the sealed case 51. The end of the suction-side refrigerant pipe Pb1 is joined to a suction opening 64 provided in the thrust plate 85.

Furthermore, an opening end portion of the suction-side refrigerant pipe Pb1 is allowed to face the introduction chamber 117.

The refrigerant which is compressive fluid is successively compressed while moving through the compressing chambers 63 so that the refrigerant discharged from the high-pressure side compression chamber 63f is adapted to pass through a discharge port (recess portion) 65 provided for the bearing 102 communicated to the high-pressure chamber 63f, and then discharged into the sealed case 51.

Lubricating oil 72A, which is refrigerating machine oil, is accumulated in the accumulating portion 72 in the sealed case 51. In this embodiment, similar to the third embodiment, the lubricating oil 72A is supplied to the slide portions between the rotating shaft 52 and the bearing 102, between the crank portion 52a and the inner support portion 60a of the roller 60, between the roller 60 and the cylinder 101 and between the blade 62 and the helical groove 61 by a oil pipe 87 of an oil pump (not shown).

The refrigerating cycle operation of the helical compressor Ac is substantially the same with that of the helical compressor A of the first embodiment.

That is, in this embodiment, since the compression unit 100 and the motor unit 54 are assembled and arranged such that the compression unit 100 and the motor unit 54 are partially overlapped to each other along the rotating shaft 2, the axial length of the helical compressor Ac of this embodiment can be shortened as compared with a conventional helical compressor having a structure such that the compression unit and the motor unit are simply, serially and separately disposed in the axial direction of the rotating shaft.

Therefore, it is possible to make the size of the sealed case 51 for accommodating the compression unit 100 and the motor unit 54 small and compact, thereby reducing the size of the air conditioner for accommodating the helical compressor Ac and a space required to install the helical compressor Ac into the air conditioner.

In addition, since the helical compressor Ac is structured such that the rotating shaft 52 is supported by the single bearing 102 which is the main bearing, the number of required elements constituting the helical compressor can be reduced. Moreover, no sub bearing is required. Thus, the process for aligning the bearings can be omitted, whereby the assembling process can easily and simply be performed.

Incidentally, when the rotating shaft 52 is supported by the single bearing 102, inclination and deflection of the rotating shaft 52 may be somewhat enlarged as compared with a helical compressor having the structure that the rotating shaft is supported by the main bearing and the sub bearing.

However, since the difference in the pressure among the compression chambers 63 which are formed by the helical blade 62 at positions between the cylinder 101 and the roller 60 is small, an adverse influence on the performance as the compressor can substantially be prevented.

First modification of the fourth embodiment of the present invention will now be described with reference to FIG. 12.

Figure 12:
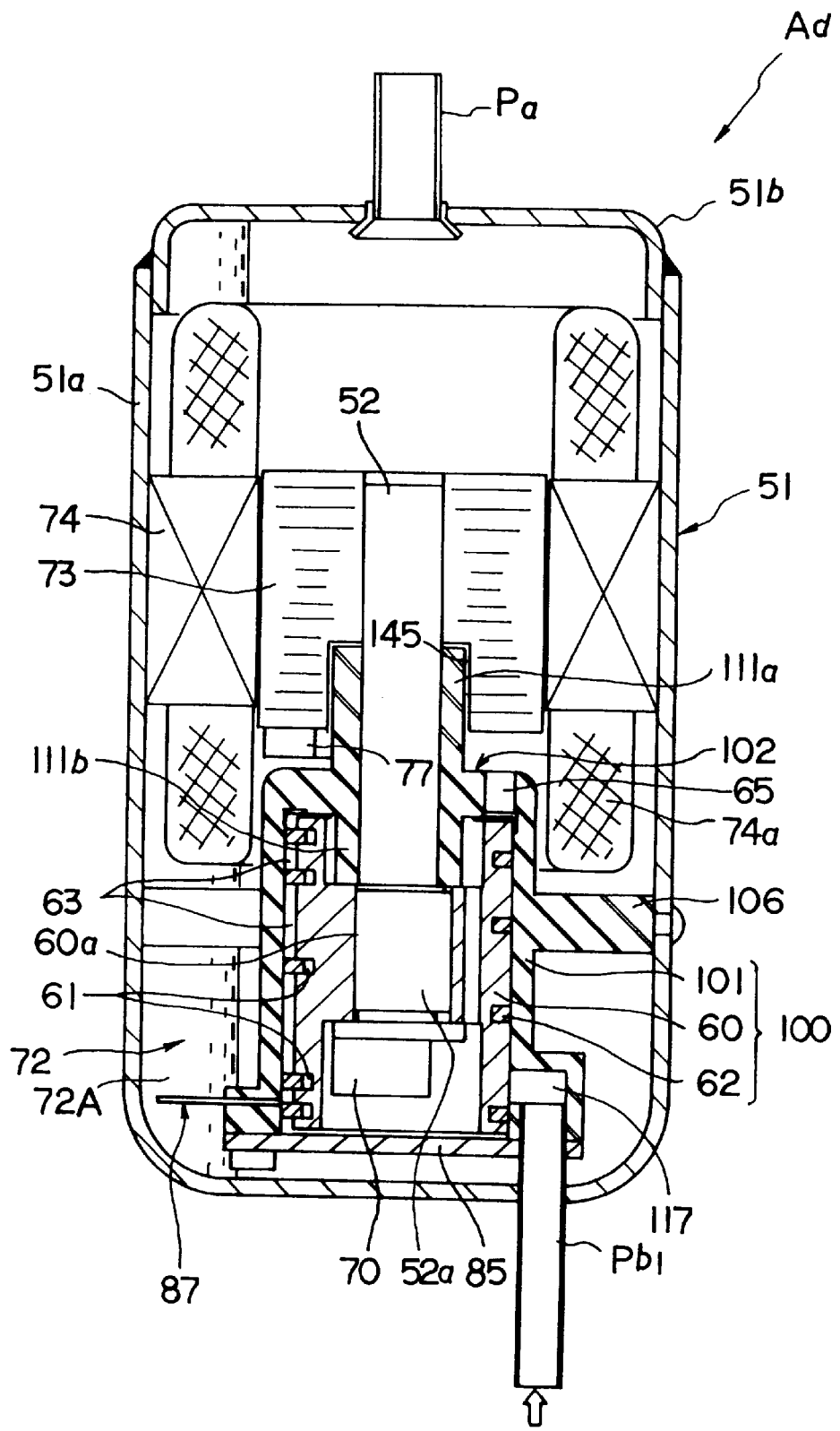
FIG. 12 is a vertical cross sectional view showing a first modification of a helical compressor according to the fourth embodiment.

FIG. 12 is a vertical cross sectional view showing the first modification of this embodiment of the helical compressor according to the present invention. Incidentally, the other elements constituting the refrigerating cycle except for a helical compressor of this modification is omitted.

A helical compressor Ad according to this modification comprises an improved structure for supporting the rotating shaft 52. The other structures are the same as those of the helical compressor Ac shown in FIG. 11. Therefore, the same elements are given the same reference characters (numerals) and the same elements are omitted from description.

The helical compressor Ad according to the first modification comprises a counter bore portion (recess portion) 145 provided for the rotor 73 of the motor unit 54. The upper boss portion 111a of the single bearing 102, which is the main bearing, is disposed and inserted in the counter bore portion 145.

The motor unit 54 has the counter bore portion 145 in the central portion adjacent to the cylinder 101 of the rotor 73. The counter bore portion 145 forms an annulus or sleeve-shape space between the rotor 73 and the rotating shaft 52. The upper boss portion 111a of the single bearing 102 for supporting the rotating shaft 52 is extended toward the rotor 73 so as to be terminated in the annulus-shape space of the counter bore portion 145. As a result, the axial length of the upper boss portion 111a of the bearing 102, that is, the axial length of the bearing 102 can furthermore be elongated, whereby the rotating shaft 52 can stably be supported.

The helical compressor Ad according to the first modification is able to furthermore smoothly and stably rotate the rotating shaft 52. Thus, an effect similar to that obtainable from the helical compressor Ac shown in FIG. 11 can be obtained.

Second modification of the fourth embodiment of the present invention will now be described with reference to FIG. 13.

Figure 13:
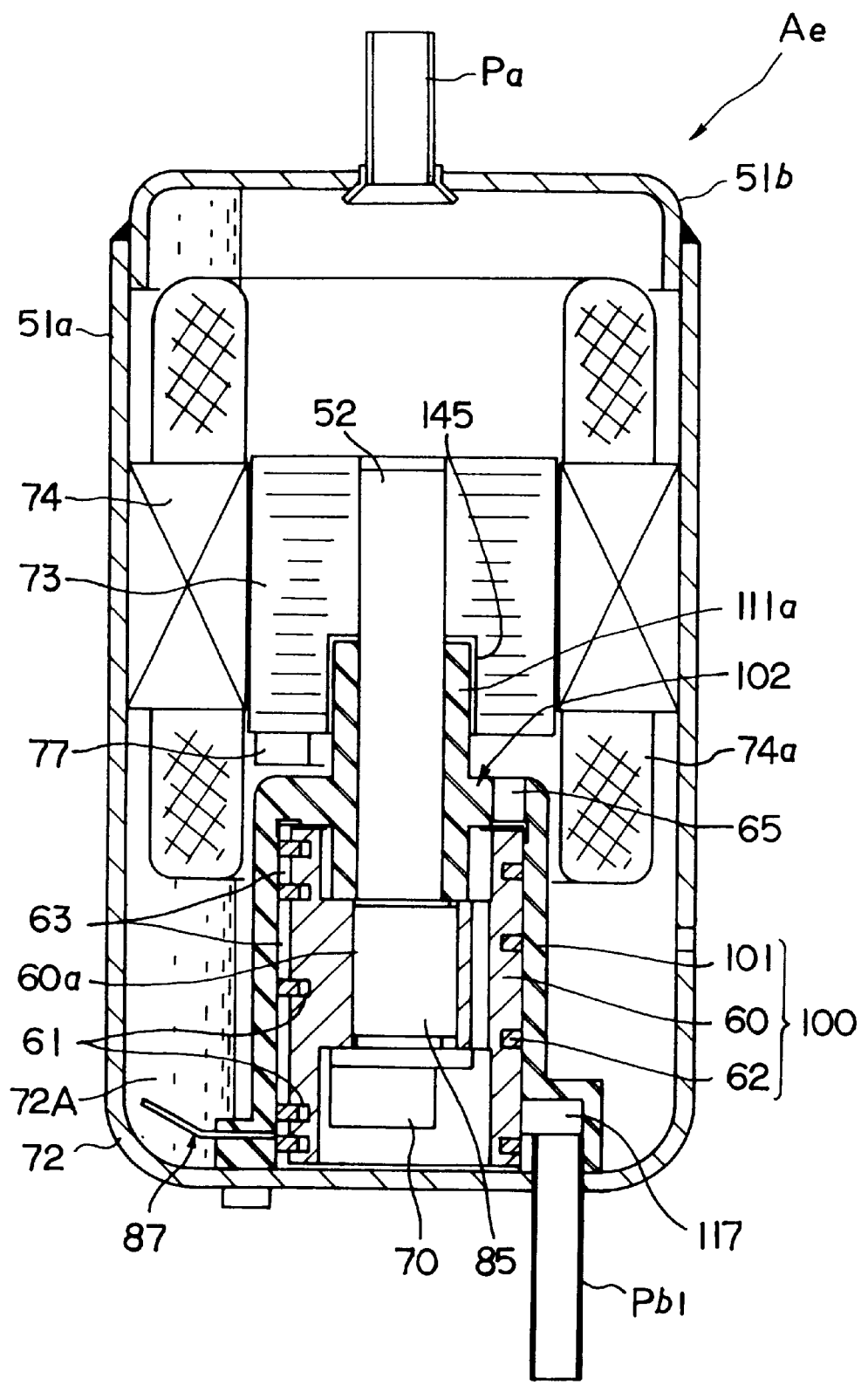
FIG. 13 is a vertical cross sectional view showing a second modification of a helical compressor according to the fourth embodiment.

FIG. 13 is a vertical cross sectional view showing a second modification of the fourth embodiment of the helical compressor according to the present invention. In addition, the other elements constituting the refrigerating cycle except for a helical compressor of this modification is omitted.

A helical compressor Ae according to this modification has a different structure for supporting the cylinder 101 from that of the helical compressor Ad shown in FIG. 12. Since the other structures are substantially the same, the same reference numerals are given to the same elements and the same elements are omitted from description.

The helical compressor Ae according to the second modification has a structure that the cylinder 101 of the helical compression unit 100 is directly secured to the inner bottom portion of the sealed case 51. The cylinder 101 is secured to the sealed case 51 so that the other end portion (lower end portion) opposite to the bearing side end portion of the cylinder 101 is closed. Thus, no thrust plate which is the end plate can be omitted, thereby reducing the number of required elements constituting the helical compressor Ae.

The helical compressor Ae according to the second modification is also able to smoothly and stably rotate the rotating shaft 52. Therefore, an effect similar to that obtainable from each of the helical compressors Ac and Ad shown in FIGS. 11 and 12 can be obtained.

Third modification of the fourth embodiment of the present invention will now be described with reference to FIGS. 14 and 15.

Figure 14:
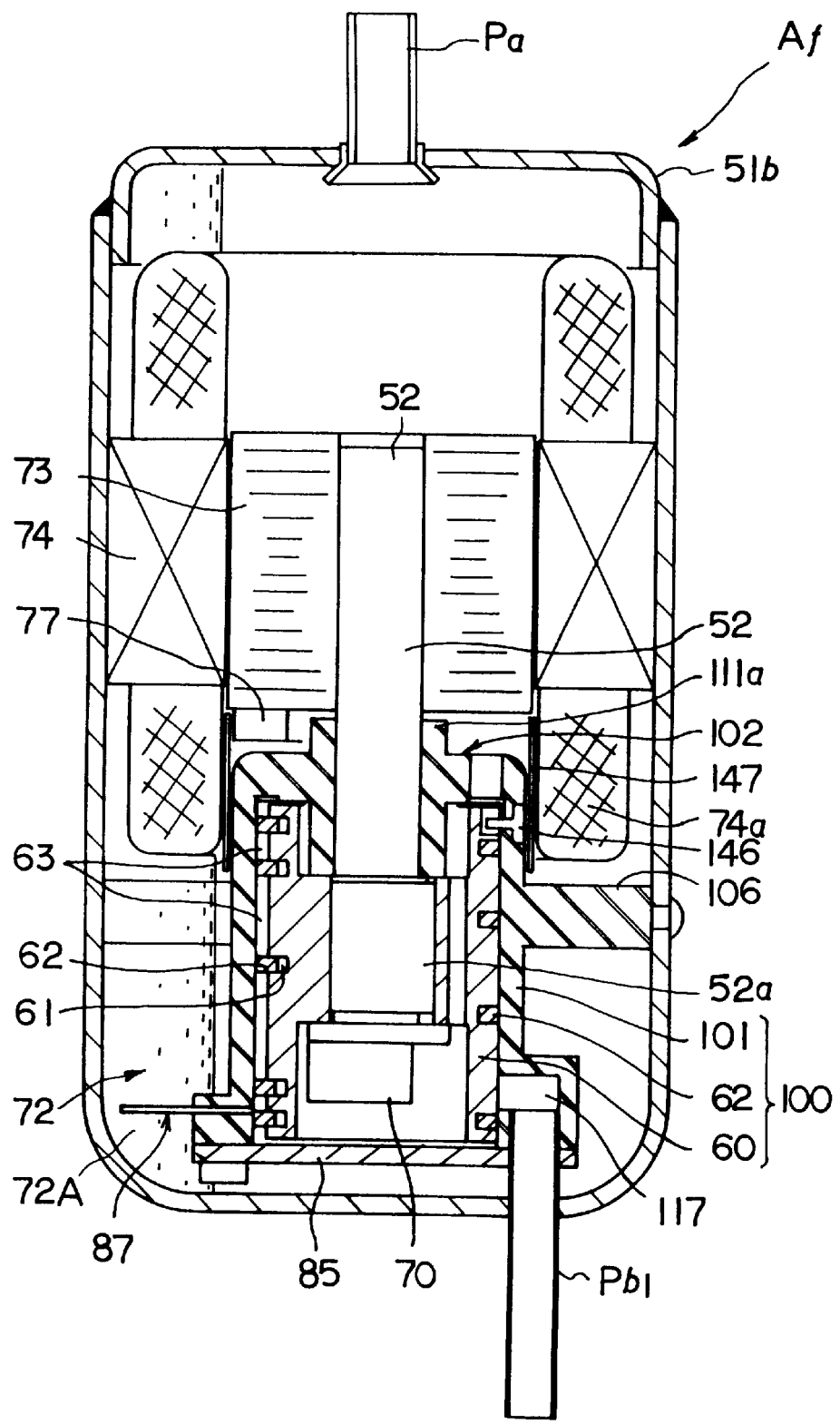
FIG. 14 is a vertical cross sectional view showing a third modification of a helical compressor according to the fourth embodiment.
Figure 15:
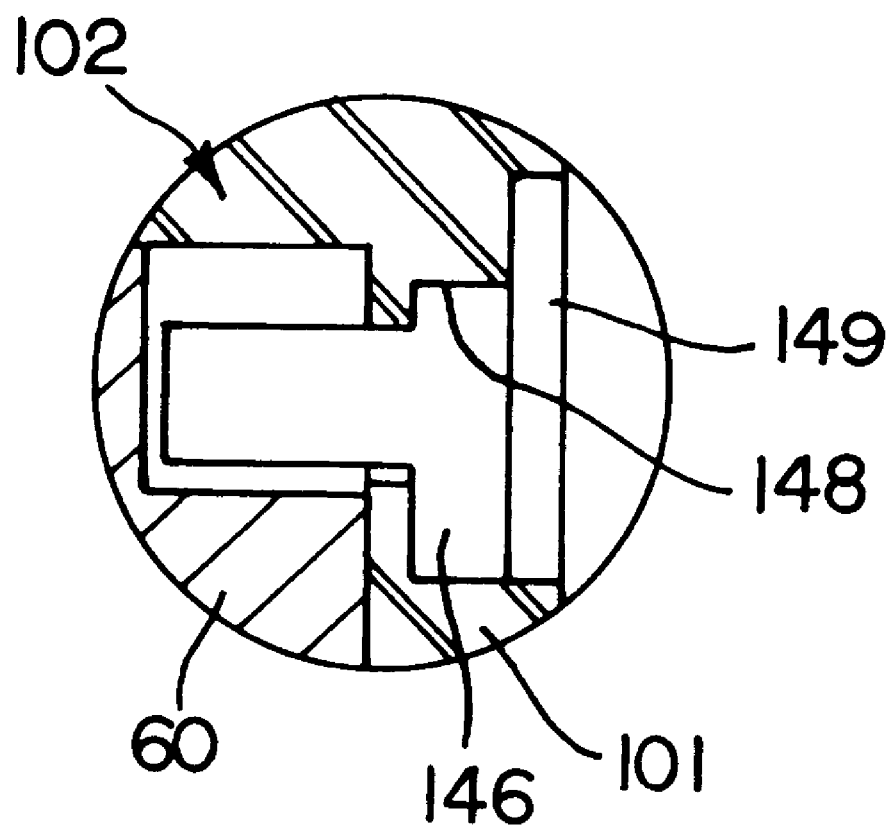
FIG. 15 is an enlarged view showing a portion of the cylinder at which the blade stopper is mounted in FIG. 14.

FIG. 14 is a vertical cross sectional view showing a third modification of the fourth embodiment of the helical compressor according to the present invention. Moreover, the other elements constituting the refrigerating cycle except for a helical compressor of this modification is omitted.

The helical compressor Af according to this modification has a basic structure which is the same as that of the helical compressor Ac shown in FIG. 11. Therefore, the same structures are given the same reference numerals and the same structures are omitted from description.

The helical compressor Af according to the third modification incorporates a blade stopper 146 provided for the cylinder 101 of the helical compression unit 100. Moreover, annular shape or sleeved shape insulating members 147 are interposed between the motor unit 54 and the bearing 102 and between the cylinder 101 and the bearing 102.

The helical compressor Af shown in FIG. 14 has the blade stopper 146 provided for the cylinder 101 at a position adjacent to the bearing 102. As shown in FIG. 15, the blade stopper 146 is retained by a blade-stopper hold portion 149 in a stopper storing hole 148 of the cylinder 101 so as to be stored. Thus, projection of a stopper head of the blade stopper 146 over the outer surface of the cylinder 101 is prevented by the blade-stopper hold portion 149.

The stopper portion of the blade stopper 146 projects into the cylinder 101 so as to be brought into contact with the leading end of the helical blade 62 so that the axial movement of the helical blade 62 is restricted.

By the blade-stopper hold portion 149, the blade-stopper 146 itself is prevented from projecting from the outer surface of the cylinder 101. Therefore, undesirable contact of the blade-stopper 146 with the coil end 74 of the stator 74 can reliably be prevented, thereby improving the reliability of the helical compressor Af.

The insulating member 147 is disposed in the inner surface portion of the coil end 74a of the motor unit 54 adjacent to the cylinder 101 so that the coil end 74a of the stator 74, the cylinder 101 and the outer surface of the bearing 102 are insulated from each other. Therefore, even if the inner surface of the coil end 74a of the stator 74 of the motor unit 54, the cylinder 101 and the outer surface of the bearing 102 are disposed adjacently, no insulation failure take place. Thus, the reliability of the helical compressor Af can be provided.

Incidentally, the helical compressor Af according to the third modification is able to obtain an effect similar to that obtainable from each of the helical compressors Ac, Ad and Ae shown in FIGS. 11 to 13.

Fourth modification of the fourth embodiment of the present invention will now be described with reference to FIG. 16.

Figure 16:
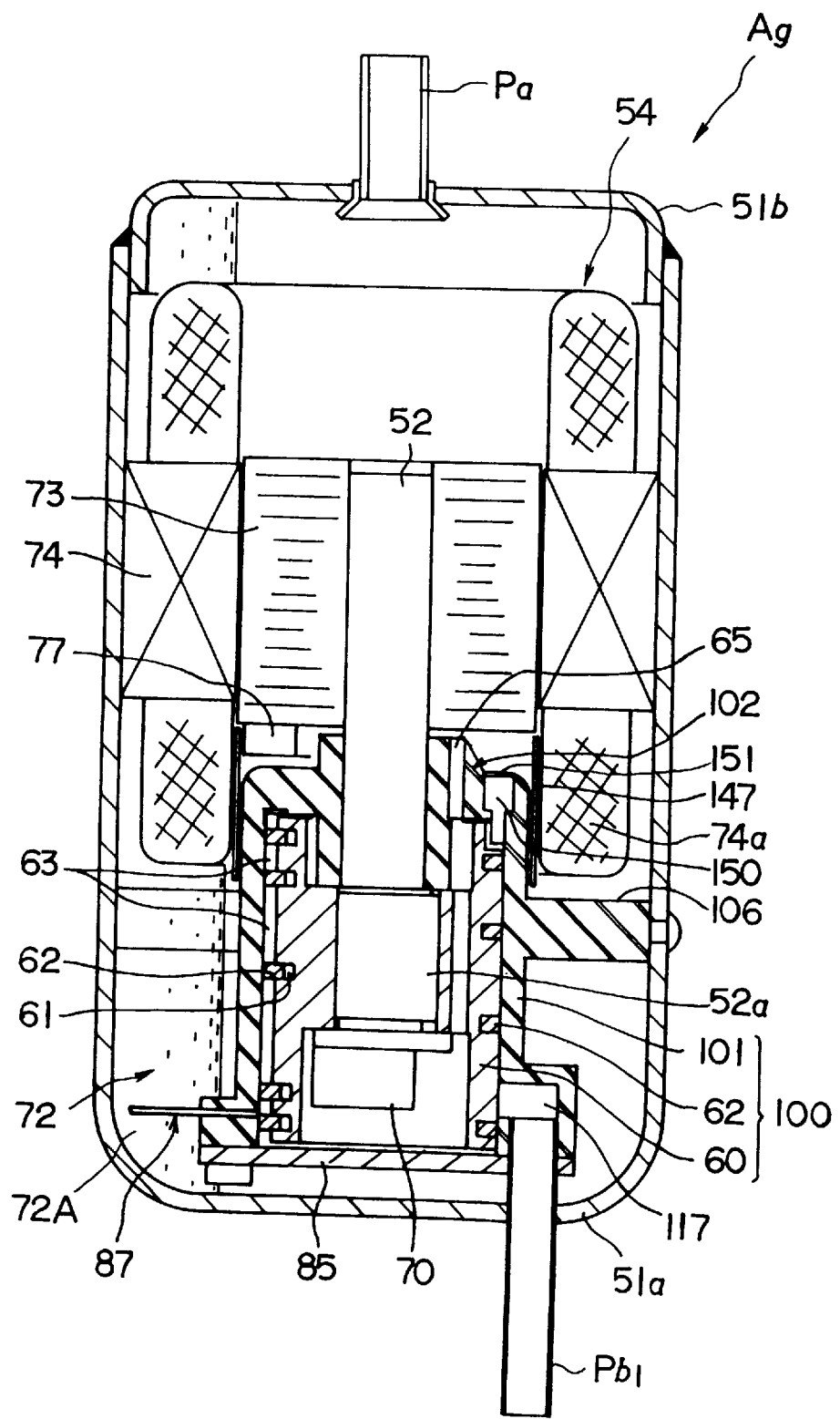
FIG. 16 is a vertical cross sectional view showing a fourth modification of a helical compressor according to the fourth embodiment.

FIG. 16 is a vertical cross sectional view showing the fourth modification of the embodiment of the helical compressor according to the present invention. Incidentally, the other elements constituting the refrigerating cycle except for a helical compressor of this modification is omitted.

A helical compressors Ag according to this modification comprises a blade stopper 150 which is, by a blade stopper storage portion 151, provided for the bearing 102 which supports the rotating shaft 52. The blade stopper 150 is disposed parallel to the axial direction of the rotating shaft 52. The other structures are substantially the same as those of the helical compressor Ac shown in FIG. 11. Therefore, the same structures are given the same reference numerals and the same structures are omitted from description.

The helical compressors Ag according to the fourth modification has the blade stopper 150 which is provided for the bearing 102. The stopper portion of the blade stopper 150 is adapted to project into the cylinder 101 so as to be brought into contact with the leading end of the helical blade 62. Thus, the axial movement of the helical blade 62 is restricted.

Since the blade stopper 150 is provided parallel to the axial direction of the bearing 102 (the rotating shaft 52), undesirable contact of the blade stopper 150 and the blade stopper storage portion 151 with the coil end 74a of the stator 74 can reliably be prevented. Therefore, the reliability of the helical compressor Ag can be provided.

In addition, the helical compressors Ag according to the fourth modification is able to attain an effect similar to that obtainable from each of the helical compressors Ac, Ad, Ae and Af shown in FIGS. 11 to 15.

Although the foregoing embodiments except for the third embodiment has been described about the vertical type helical compressor, the present invention may be applied to a horizontal type helical compressor.

In addition, in the above embodiments and modifications, the first balancer is disposed in the lower recess portion of the roller. Therefore, when attaching the first balancer to the rotating shaft after the roller is joined to the crank portion of the rotating shaft, it is easily to attach the first balancer to the rotating shaft through the lower recess portion of the roller thereby stably securing the first balancer. Moreover, in these embodiments and modifications, the first and second balancers may be used. However, the present invention is not limited to the structures.

Figure 17:
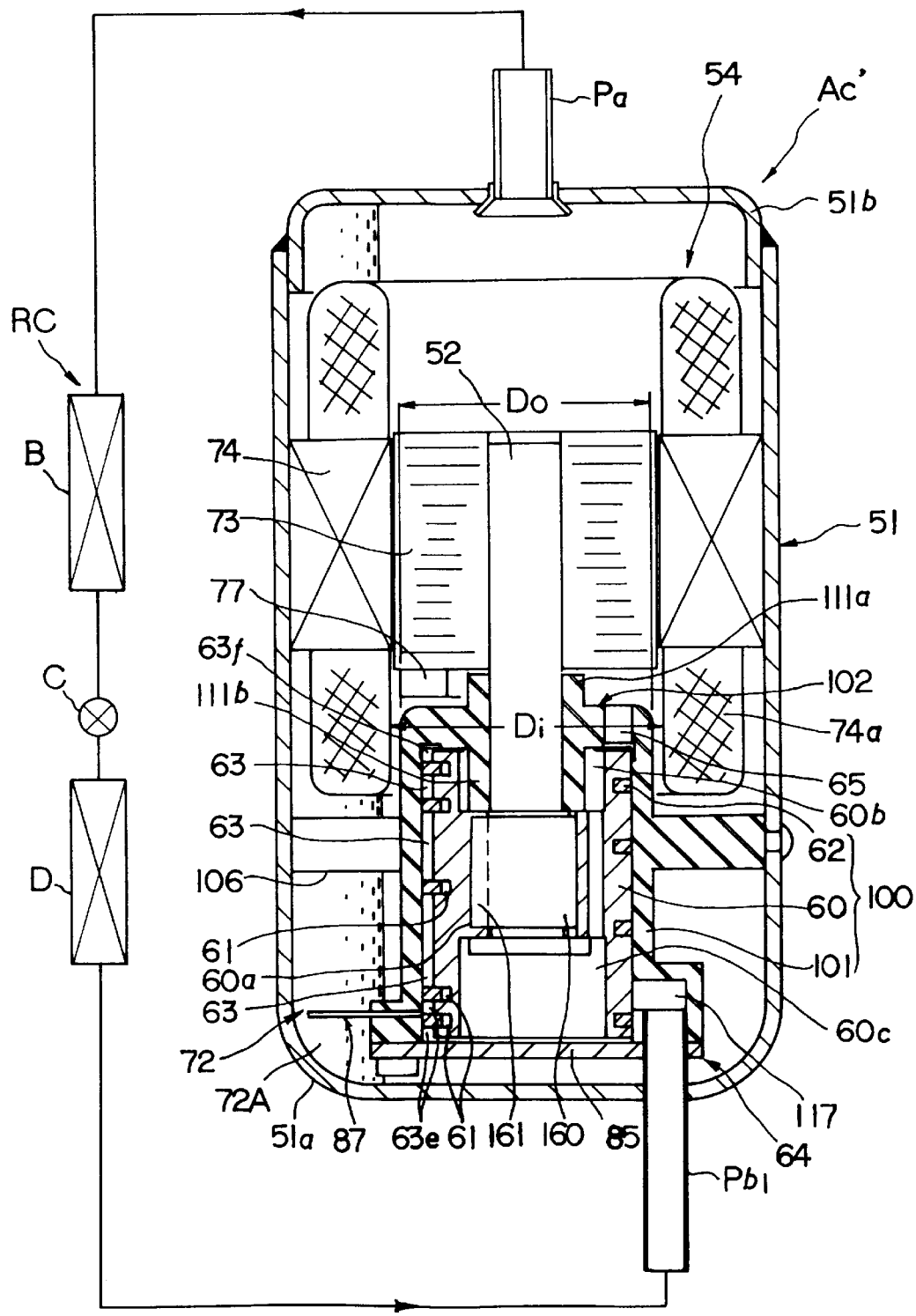
FIG. 17 is a vertical cross sectional view showing a further modification of a helical compressor according to the above embodiments.

That is, as shown in FIG. 17, the helical compressor Ac' which has substantially the same structure with, for example, the helical compressor Ac in FIG. 11, comprises a crank portion 160 having a first balancer 161 integrally formed thereto.

In this structure of the helical compressor Ac' shown in FIG. 17, only one balancer (second balancer 77) is attached to the portion positioned exteriorly to the bearing (in a case the first, second and third embodiments, between the main and sub bearings), so that the process for attaching the balancer takes a short time and is simplified.

Incidentally, the first balancer may be integrally formed to the rotating shaft, thereby obtaining the same effect of integrally forming the first balancer to the crank portion.

Furthermore, these helical compressors shown in the fourth embodiment and modifications are able to be assembled by the same assembling process of the helical compressor Ab.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of assembling a helical compressor comprising the steps of:

preparing a rotating shaft and a rotor;

inserting one end portion of the rotating shaft into the rotor thereby integrating the rotating shaft and rotor;

preparing a stator;

inserting the rotor having the rotating shaft through one end portion of an inner surface portion of the stator into the inner surface portion thereof;

preparing a compression unit having a cylinder, a rotating member eccentrically disposed in the cylinder and a helical blade disposed between an inner surface of the cylinder, the rotating member for separately forming a plurality of compression chambers therebetween along an axial direction of the rotating member and at least one bearing attached to one end portion of the compression unit for rotatably supporting the rotating shaft, said at least one bearing being adapted to close the one end portion thereof;

inserting the compression unit through the at least one bearing and the rotating member into the one end portion of the inner surface portion of the stator so that the compression unit and the stator are partially overlapped to each other along the axial direction of the rotating shaft;

preparing a case; and attaching the stator having the rotor and the compression unit to an inner surface of the case.

2. A helical compressor comprising:

a case;

a helical compression unit accommodated in the case and having a cylinder, a rotating member eccentrically disposed in the cylinder and a helical blade disposed between an inner surface of the cylinder and the rotating member for separately forming a plurality of compression chambers therebetween along an axial direction of the rotating member; and a motor unit accommodated in the case and operatively connected to the helical compression unit through a rotating shaft for eccentrically rotating the rotating member in the cylinder through the rotating shaft so that compressive fluid sucked into one of the compression chambers is moved along the axial direction while being sequentially compressed, wherein said helical compression unit and said motor unit are arranged so that the helical compression unit and said motor unit are partially overlapped to each other along the axial direction of the rotating shaft.

3. A helical compressor according to claim 2, wherein said compression unit has a main bearing and a sub bearing for rotatably supporting the rotating shaft, respectively, said main bearing and sub bearing being arranged along the axial direction such that the main bearing is close to the motor unit, and wherein said rotating shaft projects from the sub bearing toward a direction opposite to the motor unit side, further comprising a balancer attached to the projecting portion of the rotating shaft from the sub bearing.

4. A helical compressor according to claim 2, wherein said motor unit has a rotor joined to the rotating shaft and a stator disposed apart from an outer peripheral surface of the rotor for a predetermined gap and fitted in an inner surface of the case, and wherein said helical compression unit has one end portion facing to the rotor of the motor unit, said one end portion of the helical compression unit being inserted in an inner surface portion of the stator and so fitted to the inner surface portion of the stator as to be supported thereby.

5. A helical compressor according to claim 4, wherein said rotor is so disposed as to be shifted along the axial direction opposite to the compression unit side with respect to the stator, thereby forming a space between the rotor and the stator and wherein said one end portion of the helical compression unit is inserted and disposed in the formed space.

6. A helical compressor according to claim 4, wherein said one end portion of the helical compression unit supported to the inner surface of the stator is made of a non-magnetic material.

7. A helical compressor according to claim 4, wherein said one end portion of the helical compression unit supported to the inner surface of the stator is made of a non-conductive material.

8. A helical compressor according to claim 4, wherein said rotor comprises end rings at both ends thereof each of which has different and asymmetric thickness, respectively, said one thickness of the one end ring close to the compression unit as compared with the other end ring being smaller than the other thickness of the other end ring.

9. A helical compressor according to claim 4, further comprising a semi-hermetic cover having a gas hole and mounted onto one end surface of the stator opposite to the compression unit side so that a predetermined gap is provided between the cover and one end surface of the rotor opposite to the compression unit side for covering the one end surface thereof.

10. A helical compressor according to claim 4, wherein said helical compression unit has other end portion fixedly supported to the inner surface of the case so that the other end portion of the compression unit is closed by the case.

11. A helical compressor according to claim 4, wherein said helical compression unit has a main bearing for rotatably supporting the rotating shaft, and wherein said main bearing comprises a flange portion attached to an inner surface of one portion of the cylinder, said one portion including the one end portion of the cylinder and a bearing portion arranged so as to extend from the flange portion along the axial direction toward a direction opposite to the motor unit side, said rotating shaft being inserted into the flange portion and the bearing portion whereby the rotating shaft is rotatably supported.

12. A helical compressor according to claim 11, wherein said main bearing has an attachment portion projecting over the one end portion of the cylinder from the flange portion thereof and so inserted as to be fitted in the inner surface portion of the stator and the one end portion of the cylinder, said attachment portion being supported by the inner surface portion of the stator.

13. A helical compressor according to claim 11, wherein said rotor has a bore portion formed in one end portion thereof facing to the compression unit and wherein said flange portion has a boss portion for supporting the rotating shaft integrally extending from the flange portion along the axial direction toward the rotor, said boss portion being provided in the bore portion.

14. A helical compressor according to claim 4, wherein said helical compression unit is provided with a main bearing having an outer diameter for rotatably supporting the rotating shaft, said outer diameter being the same as an inner diameter of the cylinder, said main bearing is disposed inside one end portion of the cylinder, and wherein said one end portion of the cylinder facing to the rotor is inserted in the inner surface portion of the stator and so fitted to the inner surface portion of the stator as to be supported thereby.

15. A helical compressor according to claim 14, wherein said helical compression unit is provided with a sub bearing having an outer diameter for rotatably supporting the rotating shaft, said outer diameter being the same as the inner diameter of the cylinder, and wherein said sub bearing is disposed inside an other end portion of the cylinder.

16. A helical compressor according to claim 14, wherein said stator has a stepped and recessed portion formed at an end portion of the inner surface portion thereof facing to the one end portion of the cylinder and wherein said one end portion of the cylinder projects towards the stepped and recessed portion of the stator, said one end portion of the cylinder being fitted in the stepped and recessed portion of the stator so as to be supported thereby.

17. A helical compressor according to claim 14, wherein said stator has a coil end portion surrounding an outer surface of one portion of the cylinder, said one portion of the cylinder including the one end portion thereof, further comprising an insulating member interposed between the outer surface of the one portion of the cylinder and the coil end portion of the stator for electrically insulating the cylinder and the coil end portion of the stator.

18. A helical compressor according to claim 17, wherein said insulating member has an insulating film bonded to the outer surface of the one portion of the cylinder.

19. A helical compressor comprising:

a case;

a helical compression unit accommodated in the case and having a cylinder, a rotating member eccentrically disposed in the cylinder and a helical blade disposed between an inner surface of the cylinder and the rotating member for separately forming a plurality of compression chambers therebetween along an axial direction of the rotating member;

a motor unit accommodated in the case and operatively connected to the helical compression unit through a rotating shaft for eccentrically rotating the rotating member in the cylinder through the rotating shaft so that compressive fluid sucked into one of the compression chambers is moved along the axial direction while being sequentially compressed; and single bearing attached to one end portion of the compression unit for rotatably supporting the rotating shaft, said single bearing being adapted to close the one end portion thereof.

20. A helical compressor according to claim 19, wherein said rotating shaft has a crank portion for rotatably supporting rotating member and has at least one balancer integrally formed to the crank portion of the rotating shaft.

21. A helical compressor according to claim 19, wherein said rotating shaft has a crank portion for rotatably supporting the rotating member and has a first balancer integrally attached to one end portion of the rotating shaft opposite to the single bearing side with respect to the crank portion.

22. A helical compressor according to claim 21, wherein said motor unit has a rotor joined to the rotating shaft and a stator disposed apart from an outer peripheral surface of the rotor for a predetermined gap and fitted in an inner surface of the case, further comprising a second balancer attached to one end portion of the rotor close to the compression unit.

23. A helical compressor according to claim 19, wherein said one end portion of the compression unit is overlapped to the motor unit along the axial direction of the rotating shaft.

24. A helical compressor according to claim 23, wherein said single bearing is integrally formed to the one end portion of the cylinder.

25. A helical compressor according to claim 23, wherein said motor unit has a rotor joined to the rotating shaft and a stator disposed apart from an outer peripheral surface of the rotor for a predetermined gap and fitted in an inner surface of the case, said rotor has a bore portion formed at its center portion thereof between the rotor and the rotating shaft and wherein said single bearing has a boss portion integrally extending from the single bearing along the axial direction toward the rotor for supporting the rotating shaft, said boss portion being provided in the bore portion.

26. A helical compressor according to claim 23, wherein said compression unit has other end portion fixedly supported to an inner surface of the case so that the other end portion of the compression unit is closed by the case.

27. A helical compressor according to claim 23, wherein said motor unit has a rotor joined to the rotating shaft and a stator disposed apart from an outer peripheral surface of the rotor for a predetermined gap and fitted in an inner surface of the case, said stator has a coil end portion disposed at one end portion close to the compression unit and having an inner diameter, and wherein said cylinder integrating the single bearing has an outer diameter which is small as compared with the inner diameter of the coil end portion so that the cylinder integrating the single bearing is arranged in the coil end portion of the stator.

28. A helical compressor according to claim 27, further comprising an insulating member having one of an annular shape and a sleeved shape and interposed between an outer surface of a portion of the cylinder integrating the single bearing and the coil end portion of the stator, said portion of the cylinder being arranged in the coil end portion of the stator.

29. A helical compressor according to claim 27, further comprising a blade stopper mounted to the one end portion of the cylinder and adapted to be in contact with the blade for preventing the blade from moving along the axial direction.

30. A helical compressor according to claim 17, further comprising a blade stopper mounted to the single bearing and adapted to be in contact with the blade for preventing the blade from moving along the axial direction.

* * * * *